US011657665B2

(12) United States Patent
Manchovski

(10) Patent No.: US 11,657,665 B2
(45) Date of Patent: May 23, 2023

(54) METHOD AND SYSTEM FOR DECENTRALIZED DIGITAL AUTHENTICATION

(71) Applicant: Hella GmbH & Co. KGaA, Lippstadt (DE)

(72) Inventor: Nikolay Manchovski, Berlin (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 194 days.

(21) Appl. No.: 16/954,831

(22) PCT Filed: Dec. 19, 2017

(86) PCT No.: PCT/EP2017/083647
§ 371 (c)(1),
(2) Date: Jun. 17, 2020

(87) PCT Pub. No.: WO2019/120493
PCT Pub. Date: Jun. 27, 2019

(65) Prior Publication Data
US 2021/0097795 A1  Apr. 1, 2021

(51) Int. Cl.
*H04L 9/32* (2006.01)
*H04L 9/08* (2006.01)
(Continued)

(52) U.S. Cl.
CPC .............. *G07C 9/32* (2020.01); *G06Q 10/10* (2013.01); *G07C 9/00309* (2013.01);
(Continued)

(58) Field of Classification Search
CPC ....... H04W 12/06; H04W 12/08; H04W 4/80; H04W 12/03; H04W 12/04;
(Continued)

(56) References Cited

U.S. PATENT DOCUMENTS 10,745,943 B1 * 8/2020 Jonak ...................... E05B 67/02
2016/0366589 A1   12/2016 Jean
(Continued)

FOREIGN PATENT DOCUMENTS

| CN | 106453407 A | 2/2017 |
| CN | 106453415 A | 2/2017 |
| WO | 2017190794 A1 | 11/2017 |

OTHER PUBLICATIONS

Tual, Stephan: "Decentralized Smart Devices with Stephan Tual from Slock.it" https://www.postscapes.com/iot-voices/interviews/smart-devices-ethereum-stephan-tual/; Jun. 6, 2017.
(Continued)

*Primary Examiner* — Dionne Pendleton
(74) *Attorney, Agent, or Firm* — Husch Blackwell LLP

(57) ABSTRACT

A method and system for digital authentication is disclosed, in which an owner device associated with a smart lock receives identity information of a user device requesting access to the smart lock. The owner device registers first contract information of the smart contract, for granting access of the smart lock to the user device, on a decentralized trust network, and sends second contract information about the smart contract to the user device. The second contract information comprises validation information of the smart contract indicating an un-validated information of the second contract information. The user device validates the received second contract information against the first contract information on the decentralized trust network, and authenticates the user device with the smart lock using the validated second contract information.

15 Claims, 11 Drawing Sheets

(51) Int. Cl.
*G07C 9/32* (2020.01)
*G06Q 10/10* (2023.01)
*G07C 9/00* (2020.01)
*H04L 9/40* (2022.01)

(52) U.S. Cl.
CPC .......... *G07C 9/00563* (2013.01); *H04L 9/088* (2013.01); *H04L 9/3268* (2013.01); *H04L 63/08* (2013.01); *H04L 63/10* (2013.01); *G06Q 2240/00* (2013.01); *G07C 9/00904* (2013.01); *G07C 2009/00412* (2013.01)

(58) Field of Classification Search
CPC ....... H04W 12/084; H04W 4/00; H04W 4/02; H04W 4/021; H04W 4/029; H04W 4/12; H04W 4/70; H04L 63/08; H04L 63/10; H04L 63/108; H04L 9/088; H04L 9/3242; H04L 9/3239; H04L 9/50; H04L 63/0823; H04L 9/0894; H04L 2209/463; H04L 2209/56; H04L 2209/84; H04L 2463/062; H04L 41/0806; H04L 41/0813; H04L 41/22; H04L 43/0811; H04L 63/0272; H04L 63/0442; H04L 63/062; H04L 63/0807; H04L 63/0869; H04L 63/0876; H04L 63/102; H04L 63/123; H04L 67/02; H04L 67/53; H04L 9/0637; H04L 9/0643; H04L 9/0819; H04L 9/0866; H04L 9/3213; H04L 9/3234; H04L 9/3236; H04L 9/3255; H04L 9/3263; G07C 2009/00412; G07C 2009/00793; G07C 2009/00865; G07C 2209/02; G07C 9/00309; G07C 9/00563; G07C 9/00571; G07C 9/00904; G07C 9/32; G06Q 10/10; G06Q 2240/00; G16Y 10/50; G16Y 40/10; G16H 30/20; G16H 30/40; G06V 10/762; G06V 10/764; G06V 10/82; G06V 40/15; G06K 9/6215; G06K 9/6218; G06K 9/6268; G05B 13/027; G05B 19/18; G05B 19/4155; G05B 2219/39292; G05B 2219/50391; E05B 19/0005; E05B 2047/0095; E05B 2047/0096; E05B 67/02; B60R 25/24; B25J 13/00; B25J 9/161; B25J 9/163; B25J 9/1656; A61B 2576/026; A61B 5/0042; A61B 5/024; A61B 5/0533; A61B 5/055; A61B 5/163; A61B 5/374; A61B 5/7267; G06N 20/00; G06N 20/20; G06N 3/006; G06N 3/0427; G06N 3/0445; G06N 3/0454; G06N 3/0481; G06N 3/08; G06N 5/04; G06N 7/005; G06N 7/02; G06F 16/2379; G06F 16/27; G06F 21/30; G06F 21/335; G06F 21/606; G06F 21/64; G06F 2203/0381; G06F 3/013; G06F 3/015; G06F 3/017; G06F 3/0346; G06F 3/038; G06F 3/04842; G06F 3/04847; G06F 9/466; G06F 9/543

See application file for complete search history.

(56) References Cited

U.S. PATENT DOCUMENTS

| | | |
|---|---|---|
| 2017/0140408 A1 | 5/2017 | Wuehler |
| 2017/0232300 A1 | 8/2017 | Tran et al. |
| 2019/0215342 A1* | 7/2019 | Eftekhari Roozbehani ................. H04L 63/10 |
| 2021/0250355 A1* | 8/2021 | Galdo ..................... B60R 25/24 |

OTHER PUBLICATIONS

Mukhopadhyay, Mayukh: "Ethereum Smart Contract Developement", Dec. 7, 2017; Retrieved from URL: https://blockchainhub.net/smart-contracts/.

Chinese Notification to Grant dated Jan. 20, 2023, issued in corresponding Chinese application.

* cited by examiner

METHOD AND SYSTEM FOR DECENTRALIZED DIGITAL AUTHENTICATION

CROSS REFERENCE

This application claims priority to PCT Application No. PCT/EP2017/083647, filed Dec. 19, 2017, the entirety of which is hereby incorporated by reference.

FIELD OF THE INVENTION

This application is directed at a method as well as a system for decentralized digital authentication.

BACKGROUND

In order to share assets, such as houses, apartments, cars or other property items between different users, it is generally necessary that the primary owner of said asset gives a key of the asset to the temporary or additional user. Traditionally this is achieved by using a physical key or a key card. However, physical keys may be lost or duplicated and they, furthermore require the owner or a representative of the owner to physically meet with the other user.

To increase the security and convenience to the owner as well as the user of an asset or a property, different approaches for using digital keys in combination with electronic smart locks have been proposed. However, the proposed systems, such as the one proposed in WO 2015/082131 A1, require a central authority for managing and validating the keys. The central authority is a disadvantage as the user has to rely on the service provider and the origin of the secrets send by the service provider. Also, the user has no knowledge regarding how the service provider manages the user's keys.

Present day solutions either reuse digital keys several times or require that the asset is connected to the internet in order for new keys to be transmitted to the asset, thereby leaving the system vulnerable for hacker attacks.

Decentralized authentication based on Blockchain technology is discussed in US 2017/0149560 A1, but this authentication is restricted to virtual authentication to a database, which also requires internet connectivity of the virtual asset that is to be accessed.

SUMMARY OF THE INVENTION

It is therefore an object of the present application to provide a solution for substituting physical keys for people's assets, where assets may be any properties, for example immobile properties such as houses or apartments, mobile properties such as cars or bikes. The proposed solution may furthermore also be applied to unlocking virtual properties. In particular, the present application describes a decentralized secure solution for digital keys in particular for temporarily sharing ownership of unused assets. It is furthermore an object of the proposed solution that secrets such as keys for a smart lock always stay with the mobile device to which the respective smart lock is associated.

The proposed solution is generally directed at scenarios, where an owner of a property wants to grant access to a user, where said access may be conditional to rules and permissions which, e.g., specify for how long access is granted, how often and/or with which frequency access may be repeated, whether the key can be re-shared with others, whether the ownership rights change sue to the smart contract and/or whether an ability to transfer the owner is provided by the smart contract. The asset is generally protected by a smart lock as defined below and the owner and user each have an associated mobile device, referred to as the owner device and user device in the following. The owner and user may communicate with each other using their respective mobile devices and they may also send messages to the smart lock of the asset using their respective devices.

Below we first provide a glossary for terminology used throughout this application:

Smart lock: A smart lock is a lock, for example an electromechanical lock which protects a entrance to a property or an asset, which additionally contains a controller, such as a small computer which controls the actions of the smart lock such as locking and unlocking operations. For simplicity reasons in this patent document we will use the wording "smart lock" as a way of indicating a smart authentication or smart access device with a physical component or device or a mechanical element within a larger system that grants access and locks access to a physical asset such as a door, car, house, bike etc. Locking and unlocking operations may be transmitted to the smart lock from an authorized device using a wireless protocol and a cryptographic key to execute the authorization process. Smart locks, like the traditional locks, need two main parts to work: the lock and the key. In the case of these electronic locks, the key is not a physical key but a digital key installed on or entered into a smartphone by a user in order to wirelessly performs the authentication needed to automatically unlock the door. Smart locks allow users to grant access to a third party by the means of a digital key. Special applications or programs for controlling a smart lock may need to be installed on the respective user device or smart phone in order for the use to be able to control the smart phone. Such applications can be software applications or hardware applications, for example in the form of a chip or microchip.

Blockchain network: A Blockchain is a decentralized trust network realized through a continuously growing list of records, called blocks, which are linked and secured using cryptography. Each block typically contains a hash pointer as a link to a previous block, a timestamp and transaction data. By design, Blockchains are inherently resistant to modification of the data. For use as a distributed ledger, a Blockchain is typically managed by a peer-to-peer network collectively adhering to a protocol for validating new blocks. Once recorded, the data in any given block cannot be altered retroactively without the alteration of all subsequent blocks, which requires collusion of the network majority. A Blockchain network typically consists of several Blockchain nodes arranged in a decentralized system, where every node has a copy of the Blockchain.

Application Binary Interface (ABI): An ABI is the interface between two program modules, one of which is often at the level of machine code. The interface is the de facto method for encoding/decoding data into/out of the machine code. Since the smart contract is in being stored in an encoded state in the Blockchain it needs to be possible to decode it on the device. Once the smart contract is decoded it becomes a kind of API for managing the data and functions of the smart contract. Since every lock can have a different smart contract with different rules and parameters, the ABI needs to be transmitted along with the address of the smart contract to the device that should work with the ABI Thus based on the address the smart contract can be found on the Blockchain network and the ABI reveals how to work with the smart contract.

Proof of Work: A proof-of-work system is an economic measure to deter denial of service attacks and other service abuses such as spam on a network by requiring some work from the service requester, usually meaning processing time by a computer.

Smart contract: A smart contract is a computerized transaction protocol that specifies or executes the terms of a contract. A Blockchain-based smart contract is visible to all users of said Blockchain and includes details regarding the parties which participate in the contract as well as rules and permissions associated with the contract. A smart contract can be transmitted between devices for example in the form of a file or encapsulated into a data packet or message, depending on the used protocol for transfer between said devices. Smart contracts in the sense of this application are furthermore defined in the context of the Ethereum data payload that stores related information. The term "smart contract" thus refers to a data payload encoded and stored on the Blockchain or another distributed trust network.

Push notification: A message which is "pushed" from a server to a user interface. Within this document, push notification usually refers to a remote push notification, which is sent from a remote device, such as a remote server, to the user interface of a user device, such as a mobile user device. In order for the remote device to be able to directly push a notification onto the user device, a specific client application installed on the user device needs to be registered on the remote device using a unique identification or address, such as a Universally Unique Identifier (UUID) and the server application of the remote device and the client application of the user device need to have agreed to a message passing protocol, such as HTTP or HTTPS, beforehand. The client application then displays the message of the user device after receiving the message, for example by way of a pop-up window.

Public/Private key, RSA: Public key cryptography relies on each participating party having a pair of keys, a private as well as a public key. While the public key may be shared freely, the private key is never shared. The public-private key pairs provide inverse functions, i.e. a message which is encrypted using the public key may be decrypted using the private key and/or vice versa. Each key pair is chosen in such a way that the private keys may not be inferred from the public key without prohibitive (computational) cost. The RSA-cryptosystem, for example, relies on using a pair of prime numbers as the private key and their product as the public key, which is secure as there is no known efficient way for factoring large numbers. The public key of a user A may be used by a user B to encrypt a message for A, which A then decrypts using the private key. Furthermore, A may use its own private key to digitally sign a message for B, so that B can confirm the authenticity, i.e. whether the message really was sent by A, using A's public key. Note that a digital key (also referred to as a token below) for the smart lock may be different from the public or private key of the smart lock.

ECDSA: Elliptic curve digital signature algorithm (ECDSA) is another variant for a public key cryptosystem, further details may be found, e.g. on Wikipedia.

Challenge/Response Authentication: Challenge-response authentication is a family of protocols in which one party presents a question ("challenge") and another party must provide a valid answer ("response") to be authenticated. The simplest example of a challenge-response protocol is password authentication, where the challenge is asking for the password and the valid response is the correct password. Within this application, a challenge may be a message (randomly) generated by one device, which the other device signs using its private key. The first device can then confirm the identity of the other device using the public key of the other device.

Peer-to-Peer (p2p) Network and Connection: A peer-to-peer network is based on the notion of equal peer nodes simultaneously functioning as both "clients" and "servers" to the other nodes on the network, thereby differing from client-server architectures, where the (peripheral) clients only communicate directly with a central server. In a peer-to-peer network, a virtual overlay network is implemented on top of the physical network topology. Data is still exchanged directly over the underlying physical network, but at the application layer peers are able to communicate with each other directly, via the logical overlay links (each of which corresponds to a path through the underlying physical network).

Ownership: An "owner" in the sense of this application, is a person or technical device, such as a smart phone, computer, tablet etc. that is authorized to carry out technical modifications of another, associated asset or device. The owner device therefore, has the primary authority over an associated asset or other technical device.

General Packet Radio Service (GPRS): A packet oriented mobile data service on the 2G and 3G cellular communication system's global system for mobile communications (GSM).

The present disclosure is directed at a method for digital authentication, wherein an owner device, which is associated with a smart lock, receives identity information of a user device requesting access to the smart lock, wherein the information indicating that the smart lock is associated with the owner device may be pre-registered on a Blockchain network.

The subject matter of the invention is defined in the appended claims. Further examples not covered by the claims are provided for background information.

The owner device being associated with the smart lock preferably means that the owner of the owner device is also the owner of the smart lock in the sense that said owner has primary authority over the smart lock and the respective asset protected by the smart lock, and the owner may carry out technical modifications of the smart lock. The user device may request access to the smart lock or the respective asset by sending a message or file to the owner device, with said message including information regarding the requested access, such as, for example, a requested duration of the access and or additional requirements relating to the access. The message can, preferably also include identity information of the user device including, e.g., in the case of mobile phones, a phone number of the user device or another identifier of the user device or the respective user. Preferably, the identity information of the user device may also include a public key of the user device, or the owner device may access the public key of the user device stored in a public directory based on the received identity information of the user device. Access to the public key of the user device may be important for the owner device in order to subsequently send encrypted messages to the user device.

The information indicating that the smart lock is associated with the owner device, may be pre-registered on a decentralized trust network and may preferably include identity information regarding the smart lock, such as a unique identifier of the smart lock and/or public key information of the smart lock; and identity information of the owner device, which may include public key information of the owner device. Said information may be registered in the smart contract, wherein the smart lock and the smart contract may have a 1:1 relation, in which case the identifier of the smart lock may be used to indicate the address of the smart contract. Within the smart contract the owner may specified in an owner-variable, which may indicate the address of the owner's account. This can be a single value or a list of addresses, i.e. multiple values. It is furthermore specified in the smart contract who has access to the smart lock associated with the smart contract and the respective rules and permissions. Alternatively it is also possible that multiple smart contracts exist for one smart lock. In this case the smart contracts may explicitly mention the address of the associated lock.

If said information is pre-registered, the pre-registering of said information indicating the association between the owner device and the smart lock may, preferably, involve a transaction on the Decentralized trust network, with which the owner device registers the identity information of the previously unregistered smart lock, including, e.g., a public key of the smart lock and/or additional communication ID such as a Bluetooth ID on the decentralized trust network, thereby indicating ownership of the smart lock.

The described method furthermore comprises a step of registering, by the owner device, first contract information of a smart contract, for granting access of the smart lock to the user device, on the decentralized trust network.

The smart contract information may preferably include data which indicates that the user device may access, use or share the smart lock and respective asset, and may further indicate rules and permissions associated with the specific sharing arrangement, such as a time frame during which the smart contract is valid. The smart contract may be generated locally by the owner device using a respective application for generating smart contracts and may be encapsulated in a file or data packet for transmission to either the decentralized trust network or the user device. The smart contract may be encrypted using the public key of the user device and/or the smart lock and the data included in the smart contract may further be anonymized, so that other parties which have access to the decentralized trust network can only see that the smart contract exists but cannot access the sensitive information within the smart contract. In order to ensure the authenticity of the smart contract, the owner device may furthermore digitally sign the smart contract using its private key. The first contract information that is registered on the decentralized trust network may, therefore, contain encrypted smart contract information, anonymized smart contract information and/or partial smart contract information.

The described method furthermore comprises the step of sending, by the owner device, second contract information about the smart contract to the user device, wherein the second contract information comprises validation information indicating an un-validated state of the second contract information. The second contract information may, preferably comprise partial information regarding the smart contract and may, in particular, indicate to the user device that the smart contract is ready and already registered on the decentralized trust network. The second contract information may be send from the owner device to the user device using a peer-2-peer (p2p) connection, which allows (virtual) direct communication between the owner device and user device. The p2p connection can be established by way of a cloud service on which both the user device and the owner device are registered using unique identifiers. Alternatively, the p2p connection can be established using, e.g., direct Bluetooth, Airdrop, WIFI, QR codes or other possible communication channels to establish a connection between two devices. An advantage of using a cloud service is that it can utilize 3G/4G infrastructure when there is no possibility for establishing direct communication between two devices. However, in scenarios, as further discussed below, where the respective mobile devices directly synchronize with the decentralized trust network and/or when a direct communication channel between mobile devices, without the need for intermediate devices or services, as described above are used, it may be possible to eliminate the need of using a cloud service.

The second contract information being un-validated may, preferably cause the second contract information to not (yet) be sufficient for actually accessing the smart lock and the asset protected by the smart lock. Rather, the second contract information preferably primarily indicates to the user device how to validate the second contract information in order to obtain full access rights as specified in the smart contract. The use of un-validated second contract information adds an additional layer of security, as an intruder cannot use second contract information intercepted during the sending to the user device.

The method furthermore comprises the step of validating, by the user device, the received second contract information against the first contract information on the decentralized trust network, causing the validation information of the second contract information to change from the un-validated state of the second contract information to a validated state of the second contract information. The validating of the previously received information performed by the user device against information stored on the decentralized trust network preferably has two effects. On the one hand, the remaining necessary information may be obtained by the user device in order to gain access to the smart lock and protected asset. On the other hand, by validating the previously received information against the decentralized trust network, the user device also acknowledges that it has received the necessary information which adds an additional layer of security to the method.

The method furthermore comprises the step of authenticating, initiated by the user device, the user device with the smart lock using the validated second contract information. Preferably, the second contract information can be used in order for the user device and the smart lock for mutually authentication, after which the smart lock and user device may pair up for exchanging messages, such as messages to open or lock the smart lock, in accordance with the rules and permissions of the smart contract.

The user device and owner device of the present application may, for example, be smart phones or other mobile computing devices which contain a control unit, such as a CPU and capability for wireless communication and a memory for storing data. The user device or owner device furthermore preferably have a user interface through which commands can be entered by their respective users.

Thus, a method is provided wherein keys for a smart lock stay with the mobile device to which the respective smart lock is associated. Another advantage of the proposed method is that it is no longer necessary to create APIs to integrate another service provider. Rather the service provider can be provided with permission to be part of the decentralized trust network and, thereby, share a common database, which improves scalability.

The decentralized trust network may be a Blockchain network as described above. For ease of notation we will use the term "Blockchain network" when really referring to any kind of decentralized trust network in the following.

Optionally, the described method for digital authentication may furthermore comprise the steps of initializing the smart lock, by the owner device associated with the smart lock and/or registering, by the owner device, information, which indicates that the smart lock is associated with the owner device, on the Blockchain network. The initializing of the smart lock and/or the registering of the association on the Blockchain network may take place before receiving, by the owner device, the identity information of the user device, or it may take place after the owner device receives the identity information of the user device, but before the registering of the first contract information on the Blockchain network.

When the owner acquires, e.g. by buying, the smart lock, and preferably before the smart lock is installed on the asset which it is intended to protect, the smart lock may need to be initialized by the owner device. This initialization may be carried out using a short distance data connection of the smart lock, such as a Bluetooth connection or a wire. The owner device pairs up with the smart lock using said short distance data connection and exchanges public keys with the smart lock, so that the smart lock stores the public key of the owner device in order to verify whether received messages originate from the owner device. During the initialization, the smart lock may first be prompted to generate an asymmetric key pair and to then send the public key of the smart lock to the owner device, so that the owner device may encrypt messages for the smart lock. It is generally preferable that the smart lock is configured, during the initialization, to only accept messages which are signed by the private key of the owner device. Additionally there may be an option for resetting the smart lock by using some sort of superkey, which, however, should preferably never be shared with anyone. After the smart lock has been initialized and the public keys of the owner device and the smart lock have been exchanged, the owner device may register the smart lock on the Blockchain network using the account of the owner device in order to store information indicating the valid ownership of said smart lock within the immutable history of the Blockchain.

Preferably the identity information of the user device, which is received by the owner device when the user device contacts the owner device in order to request access to the smart lock, contains at least the public key of the owner device, so that any messages which are sent to the user device by the owner device can be encrypted using said public key of the user device. The smart contract generated by the owner device for the user device may then preferably comprise information regarding the public key of the user device as well as the public key of the smart lock, wherein the smart contract, the first contract information, the un-validated second contract information and/or the validated second contract information are encrypted, by the owner device using the at least one of the public keys of the user device and the smart lock, so that only the user device and/or the smart lock are able to access the relevant information. For example, the encryption may be carried out as a two-step process, first encrypting a first portion of the smart contract, containing the information regarding the user device ID and/or public key and rules regarding the smart contract such as rental period, using the public key of the smart lock and digitally signing the resulting message using the public key of the owner device. The resulting encrypted message or file is then amended by adding additional information that is relevant for the user device, such as the location and ID of the smart lock. The resulting amended message is, encrypted using the public key of the user device and, possibly, digitally signed by the owner device. This way, each of the user device and the smart lock can decrypt the relevant information after they receive the encrypted message.

The authentication between the user device and the smart lock may, preferably, comprise mutual digital signature validation, so that the user device and the smart lock can each ensure that they are paired up with the correct entity, as indicated in the smart contract or the respective validated second contract information. Mutual digital signature validation includes each of the smart lock and user device generating a challenge message for the other device, which is then sent to the respective other device wherein the other device signs the challenge using its private key and returns the signed message, so that the authenticity can be confirmed using the public key of the respective device which signed the challenge.

Preferably, after successful authentication between the user device and the smart lock, the method furthermore comprises the step of sending, by the user device, an un-lock request or instruction to the smart lock, thereby causing the smart lock to unlock and grant access of the protected asset to the user device. Other messages and requests which are sent from the user device to the smart lock may furthermore also cause the smart lock to perform respective actions, in accordance with the terms of the smart contract.

With respect to the connectivity of the smart lock, it is possible that the smart lock is a stand-alone device, which only has a local, short-distance data connection and that during authentication of the user device with the smart lock, authentication data is transferred to the smart lock in the form of a token corresponding to the validated second contract information, wherein the user device uses the token to verify that access of the smart lock is granted to the user device by the owner device.

The smart lock being a stand-alone device is sometimes preferable dues to the low cost of installation and the low power consumption compared to a device. Furthermore, a smart lock which only has a local, short distance data connection adds to the security of the system or method, as access to the smart lock requires close proximity to the smart lock. It is, hence not possible to remotely temper with or unlock the smart lock. The short distance data connection can, for example, be a Bluetooth connection, which has the advantages of being commonly installed on mobile devices and since low power Bluetooth chips, which can run for months on a small battery are energy efficient and also cost efficient to produce, and said Bluetooth chips can also be easily installed in a smart lock. Alternatively any connection that allows data exchange over short distances, such as a communication through radio waves, audio or video, under the condition that this type of connection is supported on both devices. Additionally NFC can be used, for example as a static unique identifier which can be used as an additional security feature or as an identifier that is mentioned in the smart contract.

The token is a collection of data, which encapsulates, for example in the form of a file, the data of the smart contract. Preferably, the token which is submitted to the smart lock by the user device comprises information regarding the identity of the smart lock, the identity of the user device and is digitally signed by the owner device. Thus the token contains the data which is necessary for secure authentication, in particular if the smart lock does not receive other remote data. The token can, for example contain the public key of the user device, rules and permissions related to the smart contract, and be signed by the private key of the owner device. The token might furthermore contain some identity information regarding the smart lock, so that the smart lock can determine that the token is intended for this respective smart lock. The token, however, does not necessarily need to contain the public key of the smart lock, as this information can be obtained by the user device by different means, for example using a public key directory.

As the smart lock is not connected to the internet, the encrypted token is provided which is used to exchange data between all the parties involved in the transaction. The token is, in essence, sent from the owner device to the smart lock using the user device as an intermediate media. The token is encrypted and can only be read by the owner device, the user device and the smart lock. The owner device furthermore signs the token using its private key to prove authenticity of the message to the smart lock.

Alternatively, the smart lock can have an internet connection and access to the Blockchain network, and wherein it is validated by the smart lock, on the Blockchain network, that access of the smart lock is granted to the user device by the owner device.

If the smart lock is connected to or able to connect to the internet, then it is possible for the owner device to remotely update the smart lock, thereby increasing the flexibility of usage of the smart lock. If the smart lock can access the Blockchain network, the smart lock is also able to obtain and validate the terms of a smart contract directly on the Blockchain network, either by locally synchronizing with changes made to the Blockchain or by accessing the Blockchain network using a proxy server. Thus, when the smart lock is connected to the internet, the user device can pair-up with the smart lock using a short distance connection and mutual authentication between the user device and the smart lock can happen over said short distance channel. However, after the identities of the respective other device have been confirmed by the smart lock and user device, each of the smart lock and user device can independently access the information on the Blockchain network to validate whether a smart contract for granting access of this smart lock to this user device by the owner device of this smart lock exists and which rules and permissions are associated with this smart contract.

When the smart lock has a connection to the internet, it is also possible that the validating, by the user device, the received second contract information on the Blockchain network and the step of authenticating the user device with the smart lock may happen in an interleaved fashion, wherein at least a part of the mutual authentication of the smart lock and user device may take place before the smart lock and/or the user device validates the second contract information on the Blockchain network.

When the smart lock has an internet connection, it is also possible that the smart lock receives intermittent updates, through the Blockchain account of the smart lock, regarding smart contract involving the smart lock, so that the smart lock does not necessarily need to be connected to the internet during the authentication with the user device. However, this requires that such an update against the Blockchain network must take place between the generation of the smart contract and the first attempt of accessing the smart lock by the user device based on the smart contract.

It is furthermore possible, that the owner device and the user device are each part of the Blockchain network in the sense that they each locally synchronize with changes made to the Blockchain network. This has the advantage of additional security as each device can locally generate transactions which are to be stored on the Blockchain network, for example for auditing purposes and in order to minimize the risk of an intruder unjustly obtaining access to the smart lock. Said transactions do not need to be forwarded to another device for execution, so that there is one less communication link to be secured prior to committing the information to the Blockchain.

Alternatively, it is possible that, due to storage and (computational) power constraints, the owner and/or the user device only each have a Blockchain account, through which they can access the Blockchain network, but that they do not locally synchronize with changes made to the Blockchain but rather access the Blockchain each using a proxy server, which, itself, is part of the Blockchain network and synchronizes with changes made to the Blockchain. This has the advantage of lowering the power and storage consumption of small mobile devices such as smart phones.

The present application is, furthermore, also directed at a system for digital authentication, the system comprising a mobile owner device, a smart lock and a user device, with each of said devices configured to carry out the method steps associated with the respective device, as described above with respect to the method for digital authentication.

Dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various options for digital authentication, the methods described herein may be implemented by software programs that are tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium.

Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, an information retrieval system and method to retrieve relevant information have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In order to mitigate the risk of unauthorized access, all communication within the proposed system is preferably encrypted, in particular the communication used for transmitting, confirming and/or validating ownership or, respectively, temporary authority for using a property (also referred to as "temporary ownership" throughout this application). Preferably, the validation of user credentials, i.e. the mutual authentication between the smart lock and the user device or owner device can only happen when there is a close proximity between the user device and the property. This is advantageous as a property should only be unlocked if the authorized user is close enough to take physical possession of the unlocked and, therefore, vulnerable property immediately after unlocking the property.

In addition to using a short distance communication link such as Bluetooth radio for communication between the respective mobile device and the smart lock securing the property, it is possible to use GPS or another positioning system, such as systems using, e.g., sound/ultrasound to identify proximity, in order to confirm that the user device and the smart lock are in close physical proximity of each other when authentication between the user device and the smart lock takes place.

After the mutual authentication of the user device and the smart lock, the smart lock may preferably be unlocked using a single interaction of the user device, for example through a click within the respective application installed on the user device. If the user device and the smart lock have a trusted status, it is also possible to forgo the interaction for unlocking the smart lock and the smart lock may automatically unlock whenever the user device is deemed close enough. This may, for example be achieved using a password keeper or similar software installed on the respective user device.

For additional security, the interactions between the user device and the smart lock can optionally be recorded and forwarded to the owner device and/or are stored on the Blockchain for auditing purposes. Alternatively, the recorded interaction data may be sent to a service provider and/or a rental agency, where it can be accessed by the owner of the property in case a problem has been reported with respect to the user.

The Blockchain network also serves as a repository for audit (for example keeping track of who owns the lock and/or asset and who has permission to operate and/or access the lock. Every change regarding the ownership and or permissions related to smart locks or assets registered on the Blockchain network are updated through Blockchain transactions, which are validated and recorded on the Blockchain network. Special permission is required in order to modify the data on the Blockchain network. Said special permissions can, for example, be granted with respect to an asset through a smart contract, which specifies which data can be modified by which account. A device which attempts modification of respective data then needs to sign the respective messages using the private key of the account which has special permission for data modification.

In the Blockchain any modification (transaction) is being logged as block. In order to revert a change in a particular contract, the whole network should be stopped and the ledger on all nodes should be reverted to a particular state.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
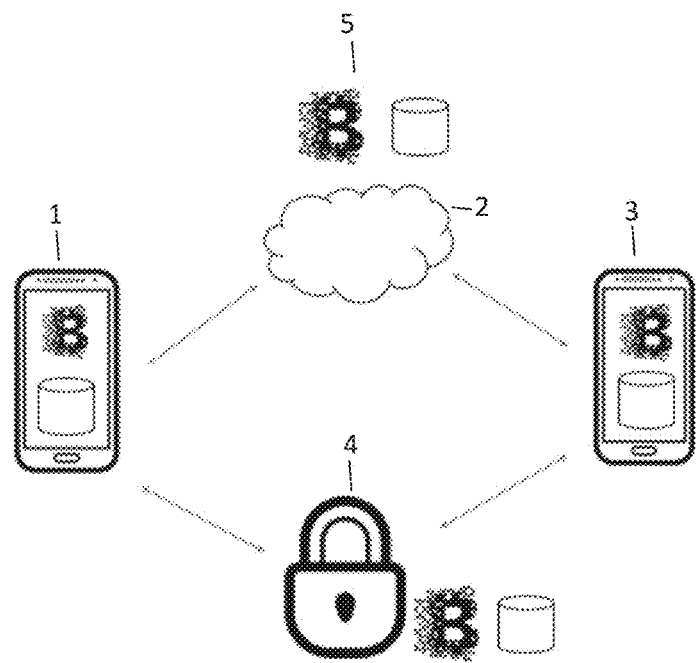
FIG. 1 shows the main components of the proposed system as well as their respective connections.

FIG. 1 shows the main components of the described system, i.e. a mobile owner device 1, a centralized service 2, such as a cloud server for providing communication between the devices and/or for providing the devices with access to the Blockchain network, a mobile user device 3 and a smart lock providing access to a sharable asset that is associated to the owner device in the sense that the person operating the owner device also has control over the smart lock 4. The devices are set up to communicate at least as indicated by the arrows, i.e. the owner device 1 as well as the user device 3 can each communicate with the smart lock 4 as well as with the centralized service 2. Each of the devices may also be part of a Blockchain network 5 in the sense that they locally synchronize with changes to the Blockchain or they may, alternatively have a Blockchain account through which they can access the Blockchain network 5 without locally synchronizing with changes. As a third option, at least the smart lock 4 can be a stand-alone device which does not directly communicate with the Blockchain network. The cloud server may be used for establishing a p2p communication between the two devices or sending a notification from one device to the server and the second device receives the notification as a push notification sent from the server. Afterwards the message may be deleted.

Different scenarios of the discussed system are described below, wherein the scenarios differ, primarily with respect to the internet and Blockchain connectivity as well as the Blockchain synchronization of the distinct devices of the system.

The scenarios described below have at least in common that a key and/or smart contract for opening the smart lock 4 by the user device 3 is generated and digitally signed by the owner device 1. Sharing of the key, smart contract or respectively generated token happens by way of the centralized service 2 and/or a (virtual) p2p connection established by way of the centralized service 2 and most if not all of the communication between the devices, in particular information relating to the key, token or smart contract, is registered on the Blockchain network 5 for auditing purposes. Authentication between either mobile device 1, 3 and the smart lock 2 is performed over a short distance communication channel such as Bluetooth or other bi-directional communication channels which are supported by both devices such as, e.g., audio, video, QR codes, AirDrop, WIFI, and involves mutual digital signature validation.

Overall, we distinguish an "online" and an "offline" solution, where offline and online refers to an internet connectivity of the asset or respective smart lock. "Offline", herein refers to scenarios where the smart lock is never or almost never connected to the internet. For example, in an "offline" scenarios, the smart lock may not have the capability and necessary technical features to independently connect to the internet, but it may be temporarily connected to the internet through another device with which it pairs up using a wire of wireless short distance data connection. "Online", on the other hand, refers to scenarios where the smart lock is connected to the internet most of the time or at least has the capability to independently connect to the internet.

Figure 2:
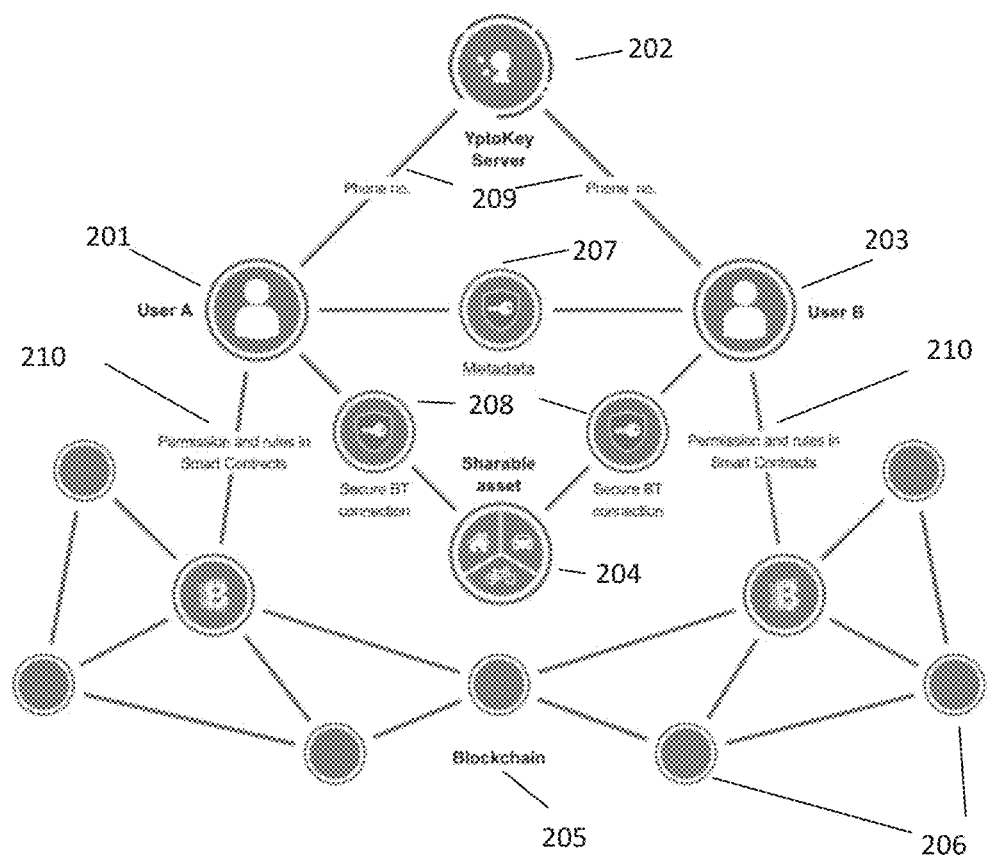
FIG. 2 schematically shows the components of the proposed system and their connections to a Blockchain network for an offline solution.

FIG. 2 illustrates a basic idea of an offline solution, where two users devices A201 and B203 are connected to a Blockchain network 205, which consists of several Blockchain nodes 206, and also to a key server 202 on which each of the user devices A201 and B203 is registered, e.g., using their respective phone number 209 and which provides secure communication between the user devices A201 and B203. The user devices may either be part of the Blockchain network 205 themselves in the sense that they synchronize with changes made to the Blockchain, or they may only have Blockchain accounts through which they can access a server which synchronizes with the Blockchain network 205. The server through which a device may access the Blockchain network is preferably part of the Blockchain network so that it can execute Blockchain transactions on behalf of the mobile devices. Said server may be different from the key server, or one server may act as both key and proxy server at the same time. The user devices A201 and B203 may exchange register rules and permissions relating to smart contracts 210 on the Blockchain network 205 for auditing purposes. The key server 202 may furthermore also be part of the Blockchain network. The user devices A201 and B203 are configured to share a sharable asset 204 which is neither connected to the Blockchain network 205 nor to the internet. One of the user devices, in this case user device A201 has primary authority or ownership of the sharable asset 204 and is configured, or instructed by the owner, to provide shared, limited and/or temporary access of the sharable asset 204 to the user device B203. The sharable asset can only be accessed using short distance communication, such as a secure Bluetooth Connection 208. Another option for a short distance data connection could be a Near Field Communication or another RFID based communication scheme. The user devices A201 and B203 may furthermore exchange (encrypted) Metadata 207 either directly or through a centralized service for providing p2p communication. The metadata 207 could, for example, include at least one of a Bluetooth UUID or another identifier for the lock, a Blockchain address of the lock in the Blockchain, a Blockchain ABI or another smart contract API, a lock name, picture and/or description or the lock or of the location of the lock or other user friendly information, or other information that can be exchanged between the users, such as, for example, if the smart contract concerns a rental or the price or GPS coordinates of the asset and/or smart lock. This centralized service may optionally be combined with the key server 202 in the sense that one server acts as both the key server and the centralized server.

Figure 3:
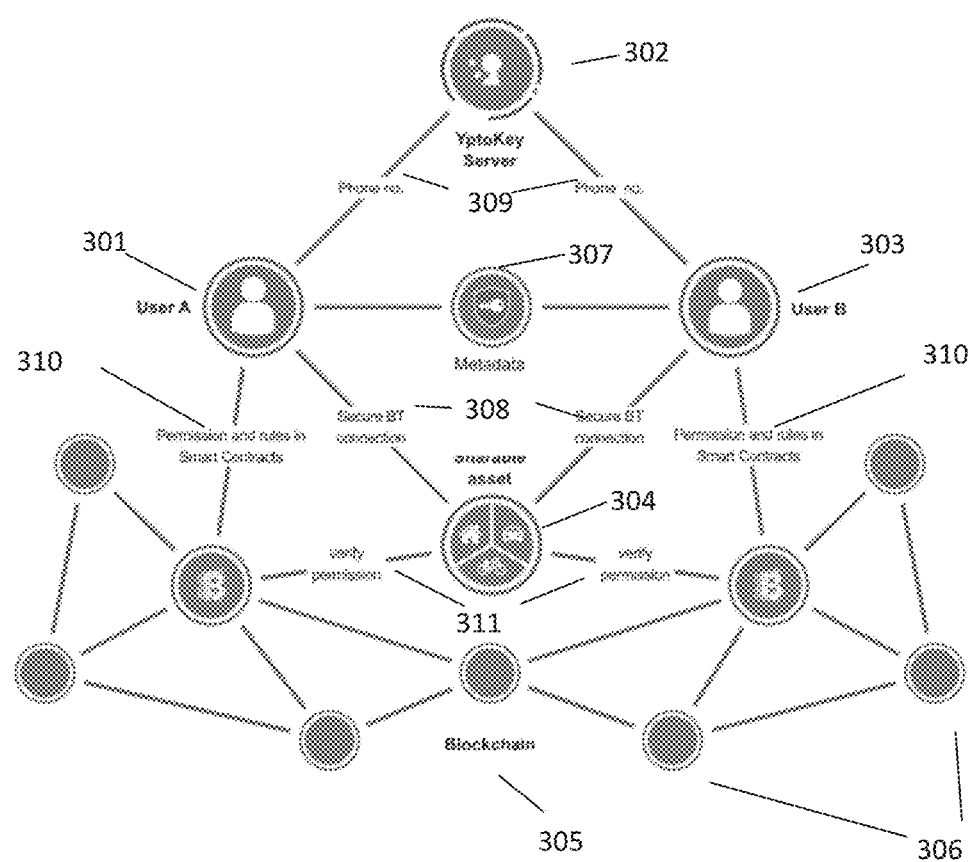
FIG. 3 schematically shows the components of the proposed system and their connections to a Blockchain network for an online solution.

FIG. 3 illustrates a basic idea of an online solution, which differs from the offline solution described with respect to FIG. 2 in that the sharable asset 304 is connected to the internet and able to verify permissions 311 directly against the Blockchain network 305. The user devices A301 and B302 according to the online solution may communicate with the sharable asset 304 through a secure Bluetooth connection 308 and they are registered on the key server 302 with their phone numbers 309. The user devices A301 and B302 may furthermore exchange (encrypted) Metadata 307 and/or other information directly using a p2p connection. As discussed with respect to FIG. 2, the user devices A301 and B303 exchange permissions and rules in smart contracts 310 with the Blockchain network and may locally synchronize with changes of the Blockchain or access the Blockchain network through a Blockchain account. The sharable asset 304 may similarly either locally synchronize with changes to the Blockchain or access the Blockchain network through a Blockchain account without locally synchronizing with changes made to the Blockchain.

Figure 4:
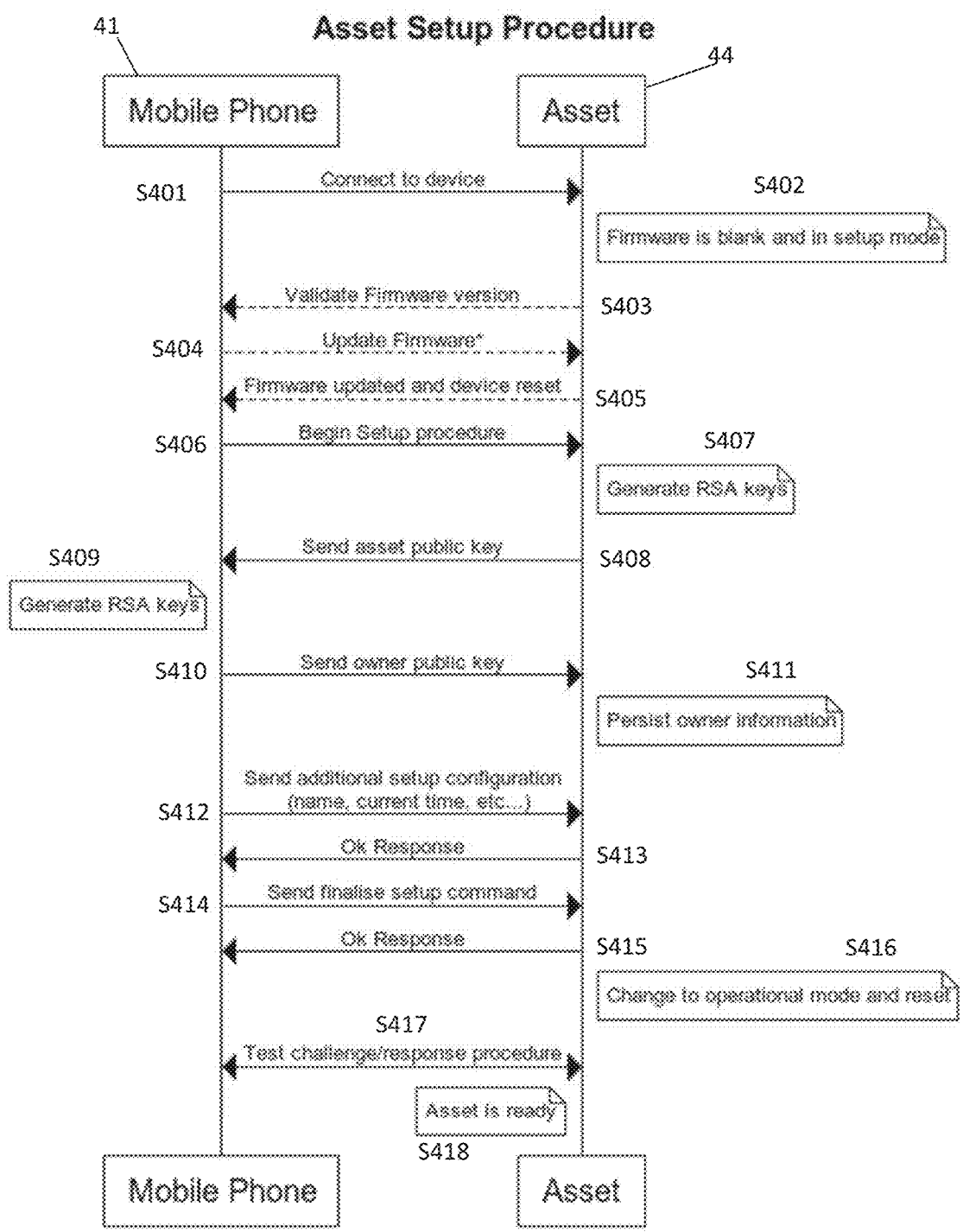
FIG. 4 shows the control flow and interaction between a mobile phone and an asset during setup.

Asset Setup:

Before discussing different scenarios for granting (temporary) access, by the owner device to the user device for a sharable asset, it is first described how an asset or smart lock is initialized or set up. FIG. 4 shows the setup procedure of a smart lock or respective asset 44 using the mobile phone 41 of the owner of the asset, wherein the procedure comprises of the following steps:

S401: The mobile phone 41 or other mobile device which is to be associated to the respective asset 44, which has smart locking capabilities, first connects to the asset, e.g. using a Bluetooth connection.

S402: At this point the firmware of the asset 44 is blank as far as digital keys are concerned and in setup mode. In this state the firmware is preferably not yet paired with an owner and has neither a private nor public key.

S403: The asset 44 may then, optionally, provide its firmware version, such as a version number, build and/or unique ID (for example a serial number) to the mobile phone 41.

S404: Based on the firmware version, the mobile phone 41 determines whether a firmware update is available and/or necessary and, if necessary, the firmware of the asset 44 may be updated.

S405: When the firmware update is complete, the asset 44 sends a respective message to the mobile phone 41.

S406: The mobile phone 41 then initiates the setup procedure.

S407: During the setup procedure, the asset 44 is configured to generate an asymmetric key pair, such as RSA keys. Additionally, the internal clock of the asset may be synchronized with the clock of the mobile phone and it is furthermore possible that additional settings, such as a auto-lock after a specified time period, are initialized.

S408: After the asset 44 has generated its keys, it sends its own public key to the mobile phone 41.

S409: The mobile phone 41 also generates a respective asymmetric key pair such as RSA keys. Alternatively, the mobile phone 41 could also use a previously generated key pair.

S410: The mobile phone 41 then sends its public key to the asset 44.

S411: The asset 44 permanently stores at least the public key received from the mobile phone 41 in order to be able to later identify said mobile phone 41 as being the owner associated with the asset 44.

S412: The mobile phone 41 may then send additional setup information such as a name of the asset 44 and/or the current time.

S413: The asset 44 replies to said messages by acknowledging receipt and stores the received information.

S414: To finalize the setup procedure, the mobile phone 41 then sends a respective finalise-setup-message to the asset 44.

S415: The asset 44 acknowledges the finalise-setup-message.

S416: After receiving the finalise-setup message, the asset 44 changes to operational mode and may, optionally, reset itself in order to apply all changes made during the setup procedure.

S417: To test whether the setup was successful, the mobile phone 41 and the asset 44 may test the authentication procedure by exchanging challenges and responses for mutual authentication. Preferably, if the authentication test fails, the asset should remain in setup mode and the setup procedure should be restarted. Furthermore, preferably, there is an option to reset the lock using a hidden button or through a respective app.

S418: The asset 44 is ready for use.

In the following, different scenarios and implementation specifications for offline solutions are discussed, where the smart lock and/or asset operate offline, i.e. without a connection to the internet and/or Blockchain network.

Figure 5:
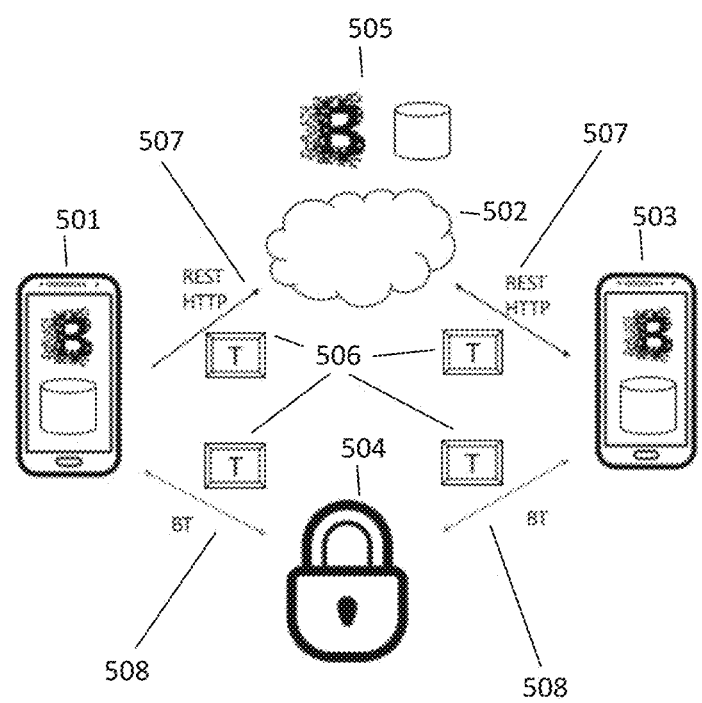
FIG. 5 shows the main components of FIG. 1 and their connections according to a first implementation scenario (also referred to as scenario 1).

Scenario 1:

According to a first scenario, as illustrated in FIG. 5, the owner device 501 as well as the user device 503 are part of the Blockchain network 505 in the sense that they are running locally on one or more Blockchain nodes which automatically synchronize with changes in the network. The smart lock 504 only has a short distance data connection, such as a Bluetooth radio 508 and, in particular, does not have an internet connection.

Data necessary for opening (or other respective actions) of the smart lock 504 is transmitted to the smart lock 504 in the form of a token 506 which represents a smart contract to which the owner device 501 and the user device 503 have agreed with respect to the asset protected by the smart lock 504.

Before such a token for granting access to the smart lock 504 can be generated and shared by the owner device 501, the owner device needs to register the smart lock 504 on the Blockchain network 505, so that identity information regarding the smart lock 504 and identity information regarding the owner device 501 are associated with each other in such a way that ownership of the smart lock 504 by the owner device 501 is registered on the Blockchain. This registration may be achieved by creating a respective smart contract, for example by using a predefined template or through a respective user interface. The smart contract and/or related information, may then be published on the Blockchain network through a transaction.

The owner device then needs to receive information regarding the user device 503, including at least the public key of the user device 503. The communication between the owner device 501 and the user device 503 is implemented via a p2p connection established through the cloud server 502. The owner device 501 and the user device 503 communicate with the cloud server 502 through a connection 507 based on a REST architecture and using the HTTP protocol.

After the owner device 501 and the user device 503 (or their respective owner and user) have reached an agreement regarding the sharing of the asset protected by the smart lock 504, the owner device generates a respective smart contract and/or, which is registered on the Blockchain network for, for example, auditing purposes and for verifying the permission of the user and/or the owner. If the lock is internet connected and is part of the Blockchain the lock may verify the user and its permission rules against the smart contract on the Blockchain network directly.

The token 506 comprises information regarding the rules and permissions associated with the specific sharing agreement, the smart lock 504, the owner device 501 and the user device 503.

While it is possible that the smart contract and the token 506 are separate entities containing different information, in this scenario, the token contains all relevant information regarding the smart contract, so that the terms "token" and "smart contract" may be used interchangeably.

The token 506 is then transmitted to the user device 503 through a p2p connection established via the cloud server 502, which supports p2p encryption. Options for implementing the communication and, in particular, the transmission of the token from the owner device to the user device are described below with respect to FIG. 7.

After the user device 503 receives the token 506 or a notification regarding the token 506, the user device 503 verifies the token 506 against the Blockchain to make sure that the token 506 represents the correct information. This verification may also alter the token 506 in such a way that the previously unvalidated token becomes validated, wherein only a validated token 506 may be used in order to access the smart lock 504. How precisely the token may be validated can be described in the smart contract. For example, once the owner adds the user to an allowed users list in the smart contract, the smart contract is in a wait state—waiting user confirmation. Once the user confirms the rules of the contract by making a transaction to the smart contract, a flag indicating that user allowance is complete is enabled and access is enabled. The user cannot fake the transaction as the transaction should be signed by the user's private key. The smart contract will enable the flag and do the flag modifications only if the transaction is coming (signed) from the user with proper account. The validation may also be achieved by downloading additional necessary information from the Blockchain network after the initial notification regarding the token 506 has been received by the user device 503. The validation procedure also serves to verify that the token 506 has been received and accepted by the user device 503 and it registered on the Blockchain network, that the user device 503 has received and/or validated the token 506. This is required also for legal reasons, so that the smart contract has been accepted by both parties, similarly to both signatures being required on a paper contract. Additional implementation details regarding the receipt and validation of the token by the user device are described below with respect to FIG. 7.

According to scenario 1, the mobile devices 501, 503 are participants of the Blockchain network 505, i.e. the owner device 501 as well as the user device 503 each hold all necessary information locally as a synchronized copy of the Blockchain ledger and each respective mobile device 501, 503 receives incremental updates which are synchronized throughout the Blockchain network 505.

When a token or smart contract of the owner device 501 is shared, e.g. sent to, the user device 503, the user device 503 receives a push notification sent by the owner device 501 via a p2p connection with the user device 503. The user device 503 needs to be synchronized with the latest version of the Blockchain before the user device 503 can receive and validate the information of the key, token or smart contract against the Blockchain, which is done locally on the user device 503 using the locally stored copy of the Blockchain ledger.

In one example of scenario 1, the token 506 itself is generated locally by the owner device 501 and corresponds to the respective smart contract. In another example, the token 506 and smart contract may comprise different data. According to scenario 1, the token 506 is encrypted using the public key of the smart lock 504 as well as using the public key of the user device 503. Furthermore, the token 506 is digitally signed by the owner device 501. Thus, the token 506 comprises the public key of the user device 503, the public key of the smart lock 504, the local ID, such as for example the Bluetooth ID, of the smart lock 504 and the Blockchain address of the smart lock and the smart contract Application Binary Interface (ABI). The token 506 may furthermore comprise additional rules and restrictions which are part of the smart contract, such as, for example, a rental period, how often and/or with which frequency access may be repeated, whether the key can be re-shared with others, whether the ownership rights change sue to the smart contract and/or whether an ability to transfer the owner is provided by the smart contract.

The smart contract usually contains information regarding the smart lock 504 such as a Bluetooth ID of the smart lock 504, so that the user device 503 can send the token 506 to the smart lock 504. After receiving the token 506, before the smart lock 504 performs any actions such as opening the smart lock 504, an authentication of the smart lock 504 with the user device 503 is necessary. The authentication is based on mutual validation of cryptographic signatures and is further described below with respect to FIG. 8. The smart lock 504 furthermore confirms the authenticity of the token 506 by verifying the digital signature of the owner device 501 using the public key of the owner device 501.

Thus, according to scenario 1 the token 506 provides an encapsulated message from the owner device 501 to the smart lock 504, which is transmitted via the user device 503. The owner device 501 is associated to the smart lock 504 and has the necessary digital key (i.e. the private key of the owner device 501) to control the actions of the smart lock 504. Said token 506 which is used for accessing an asset without an internet connection can be described as a self-contained collection of data which the smart lock 504, which only has access to short distance data connections, needs in order to validate the user device 503 against the smart contract and also in order for the smart lock 504 to obtain details of the smart contract such as rules regarding access properties (when, for how long is access permitted).

After the token 506 has been verified and a secure Bluetooth connection has been established between the user device 503 and the smart lock 504, a command, such as a command to open the smart lock 504, may be sent from the user device 503 to the smart lock 504, causing the smart lock 504 to unlock wherein "unlocking" may either be a mechanical action, such as a motor which physically moves a bolt of a door, or an electronic or even virtual action through which access to a previously (mechanically, electronically or virtually) locked entity is achieved.

Figure 6:
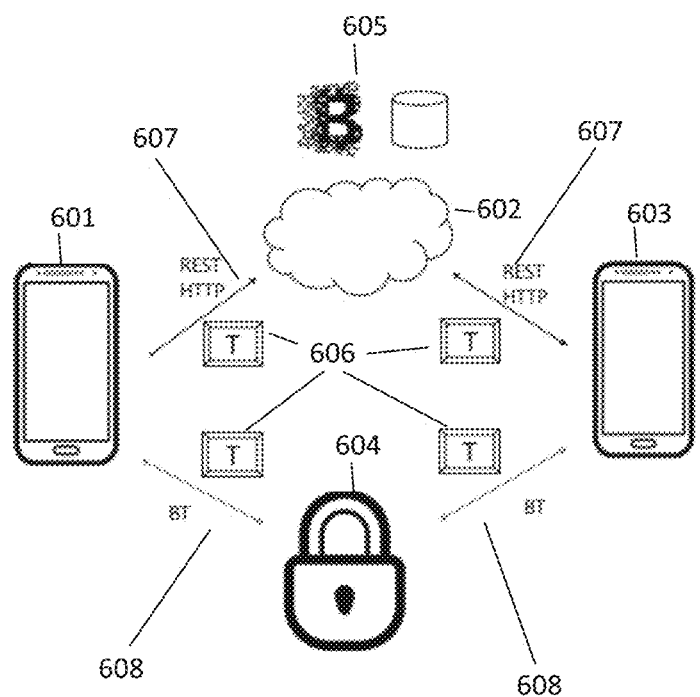
FIG. 6 shows the main components of FIG. 1 and their connections according to a second implementation scenario (also referred to as scenario 2).

Scenario 2:

According to a slightly different alternative scenario 2, as illustrated in FIG. 6, it is possible that the owner device 601 and/or the user device 603 each have a Blockchain account but do not locally synchronize with the Blockchain network 605. Rather, the respective devices use a proxy server to exchange information and transactions within the Blockchain network using the cloud server 605, which is accessed by the owner device 601 and the user device 603 through a connection 607 based on a REST architecture and using the HTTP protocol.

As in scenario 1, the smart lock 604 does not have internet connection and only has short distance data connection such as Bluetooth radio 608 and the data is transferred to the smart lock 604 in the form of a token 606, which contains the same or similar data as discussed above with respect to scenario 1.

The smart lock 604 is initially set up by the owner device 601. Details regarding an implementation of the setup procedure are discussed above with respect to FIG. 4.

Similarly to scenario 1, the token 606 is generated by the owner device 601 for the user device 603, which may include, for example, the public key of the smart lock 606 and/or the public key of the user device 603 and which may furthermore be signed using the private key of the owner device 601 is then registered with the Blockchain network 605 by the owner device 601 using the Blockchain account of the owner device 601 for accountability and auditing purposes.

Differently from scenario 1, the owner device 601 and the user device 603 are not themselves a part of the Blockchain network 605 and do, in scenario 2, not locally synchronize with changes made to the Blockchain. Rather the owner device 601 as well as the user device 603 each have a Blockchain account, though which they can access information stored on the Blockchain network 605 through the cloud server 602, which serves as a proxy server or a cloud infrastructure which synchronizes with the Blockchain network 605. Furthermore, the cloud server 602 or another server provides the necessary infrastructure for p2p connection between mobile devices such as the owner device 601 and the user device 603 in addition to providing an interface for the mobile devices for interacting with the Blockchain network 605. In general, the proxy server does not need to access the Blockchain network in order to establish a p2p connection.

In order to interact with the Blockchain network 605, each mobile device has a Blockchain account through which said mobile device may access the Blockchain network 605. If the owner device 601 and/or user device 603 does not locally synchronize with the Blockchain, the respective device may instead request and access information regarding the Blockchain network 605, including information regarding smart contracts and respective tokens, via a cloud service interface. This means that transactions are created and signed locally, but forwarded for execution to the cloud server 602. The cloud server 602 then executes the respective transaction on the Blockchain network 605 on behalf of the mobile device, which has the same effect as if the transaction had been executed locally on a mobile device which synchronizes with the Blockchain network 605 itself. In particular, the cloud server 602 is synchronized with the latest blocks from the blockchain network, which is necessary in order for the cloud server 602 to successfully execute the respective transaction and provide notification about the progress of the transaction to the respective mobile device.

When the token, or some information regarding the token, is sent to the user device 603 by the owner device 601, by way of the cloud infrastructure the user device 603 receives push notification, preferably encrypted push notification, from the owner device 601. The push notification may contain a token or part of a token as further discussed below with respect to FIG. 7. The user device then verifies the information received with the push notification with the Blockchain network 605 through the cloud server, thereby validating the respective token as discussed above with respect to scenario 1. The digital token may contain the same data components as discussed above with respect to the token of scenario 1.

The authentication between the user device 603 and the smart lock 604 also happens in the same manner as discussed above with respect to scenario 1, i.e. using mutual digital signature validation. After the smart lock 604 has verified that the user device 603 is the same as the user device 603 indicated by the smart contract or token, the smart lock 604 then accepts action commands from the user device 603 according to the rules and restrictions specified within the token.

Application scenarios 1 and 2 are thus based on the assumption that the smart lock does not have a connection to the internet but rather only has local, short distance mobile connection, for example by using a Bluetooth radio or NFC.

In both scenarios 1 and 2, the communication between, on the one hand, the mobile devices, i.e. the owner device as well as the user device, and, on the other hand, the cloud infrastructure my be based on a REST architecture and the HTTP protocol.

Figure 7:
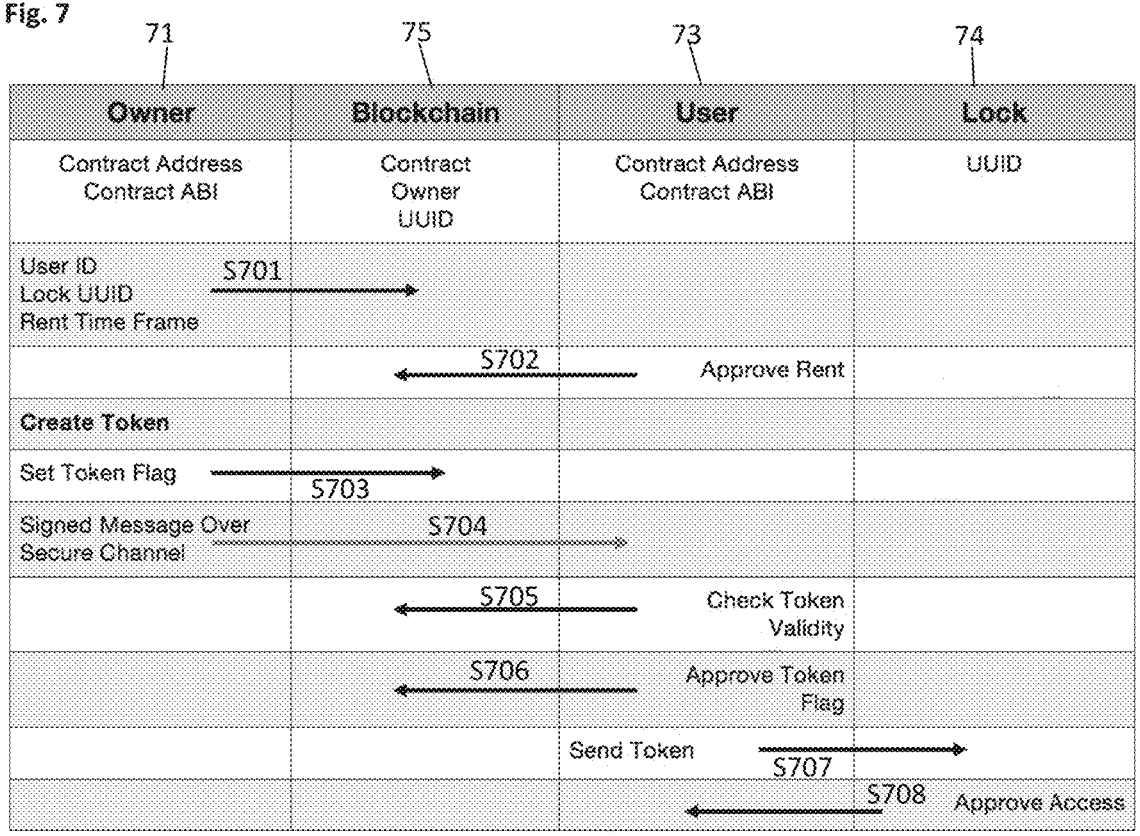
FIG. 7 shows the interaction of the components before during and after the creation of a token.

FIG. 7 illustrates the lifecycle of a token with respect to an offline solution as discussed with respect to scenarios 1 and 2. FIG. 7 shows the interaction of four different parties, that is the owner device 71 associated with the smart lock 74 and/or asset, the user device 73 to which (possibly temporary and/or restricted) access of the asset is to be granted and the Blockchain network 75.

During an initial setup process of the smart lock 74, the owner device 71 and the smart lock 74 exchange their public keys which are later used for verifying digital signatures and for encrypting messages. The setup of the smart lock 74, which is described in greater detail with respect to FIG. 4, should preferably take place as soon as possible after the smart lock 74 is received by the owner, in order to minimize the risk of others accessing the vulnerable smart lock 74 before setup.

After the setup of the smart lock 74 but prior to token creation, a smart contract is agreed to between the owner device and the user device, wherein the smart contract specifies the IDs of the involved parties (user ID, owner ID as well as a smart lock or asset ID).

In step S701, the owner device 71 registers information regarding the smart contract on the Blockchain network, including the public key of user device, the rental period (including start and end time) and the Bluetooth ID of the smart lock/asset. In Step S702 the user device 73 approves the smart contract and may also provides its own public key to the Blockchain, if the user device has not already done so before, where it can be accessed by the owner device 71.

The token is then created by the owner device and registered on the Blockchain network. The token contains information regarding the smart contract and is encrypted by the public key of the user device, the public key of the smart lock and is signed by the private key of the owner device.

In particular, the owner device sets a token flag (Step S703) to indicate that the token is ready for download by sending push notification (Step S704) to the user device. The push notification may be digitally signed by the private key of the owner device 71 in order to confirm authenticity of the push notification. The user device 73 confirms the receipt of the push notification and checks the validity of the token against the Blockchain (Step S705). The user device 73 furthermore approves the token flag (Step 706) and may download additional token information over a secure channel and using his Blockchain account for accountability. This step serves, on the one hand, for the user device to obtain the token and, on the other hand, to confirm that the token has, indeed been obtained by the user device, which creates additional security for the owner of the asset.

The user then sends the validated token to the lock using the UUID of the lock as indicated by the token (Step S707) and the lock approves access (Step S708). The message exchange between the user device and the asset is also described below with respect to FIG. 8.

Figure 8:
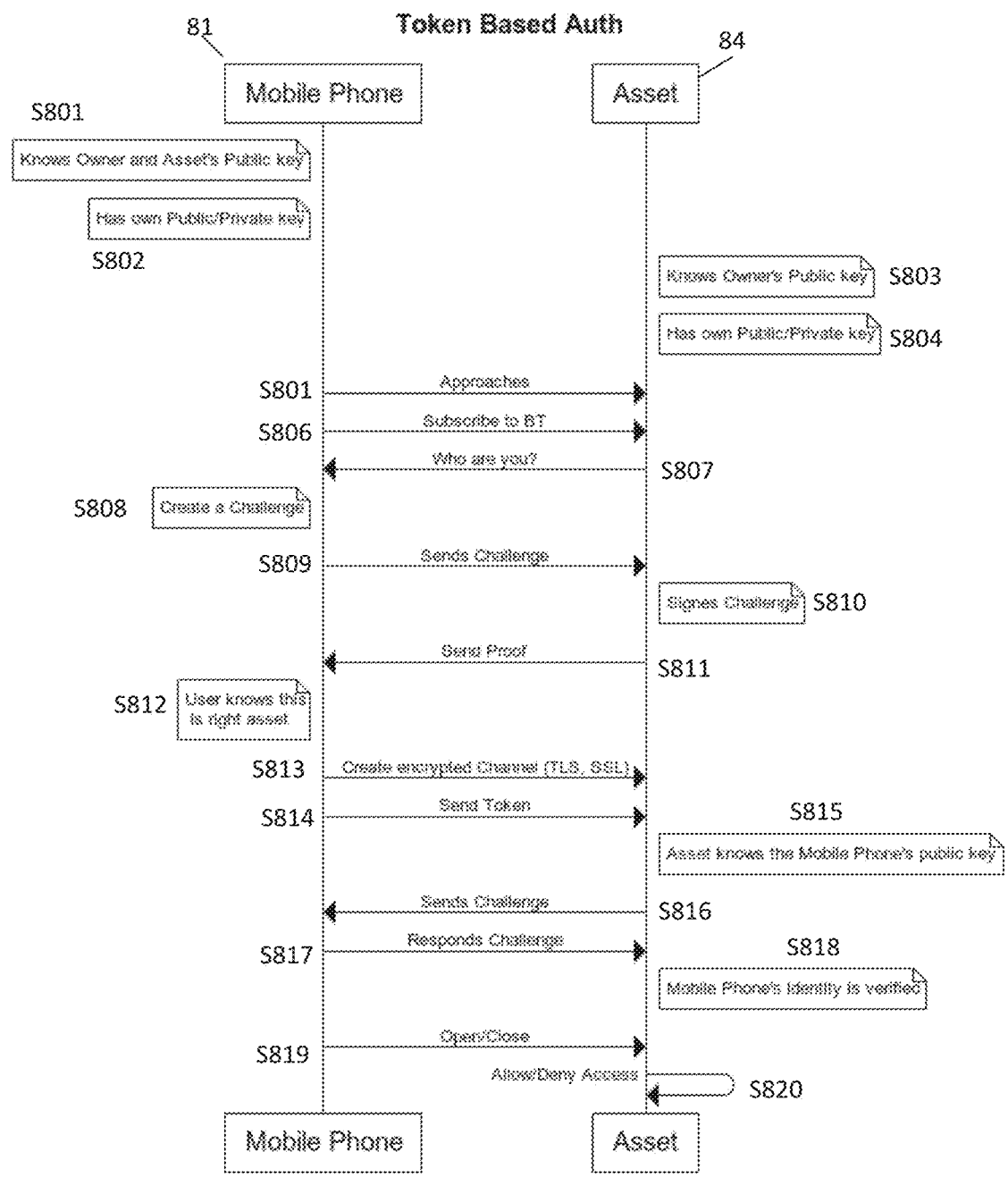
FIG. 8 shows the control flow and interactions between a user device and a car during token based authentication.

FIG. 8 provides an example for a token based authentication between the user device 83 and a smart lock of an asset, in this case the smart lock of an asset 84, such as a car, home etc. The authentication is a multi-step process as follows:

S801: The user device 83 knows the public security keys of the owner device as well as the smart lock of the asset 84. Said public keys can be easily obtained through a directory of public keys or from the smart contract or token.

S802: Additionally, the user device 83 knows, by default, its own private key.

S803: The smart lock of the asset 84, at the same time, has knowledge regarding the public key of the owner device, and, S804, knows its own private key by default.

S805: The user device 83 approaches the smart lock of the asset 84 and, S806, contacts the smart lock of the asset using the Bluetooth ID of the smart lock of the asset 84.

S807: The smart lock of the asset 84 responds to the Bluetooth connection and the two devices pair up using Bluetooth radio.

S808: The user device 83 creates a challenge in order to verify whether this is the right smart lock of the asset.

S809: The user device 83 sends the challenge over Bluetooth to the smart lock of the asset 84.

S810: The smart lock of the asset 84 signs the challenge using its private key.

S811: The smart lock of the asset 84 returns the signed challenge as a proof to the user device over Bluetooth.

S812: The user device 83 uses the public key of the smart lock of the asset 84 to verify that this is the right asset 84.

S813: The user device 83 creates an encrypted Bluetooth (such as TLS, SSL) channel for the further communication with the smart lock of the asset 84.

S814: The user device 83 sends the token to the smart lock of the asset 84 over the encrypted Bluetooth channel.

S815: The smart lock of the asset 84 can confirm that the token was created by the owner device using the owner devices public key and the smart lock of the asset 84 then knows the public key of the correct user device from the smart contract.

S816: The smart lock of the asset 84 creates and sends a challenge for the user device in order to confirm the identity of the user device.

S817: The user device 83 encrypts the challenge using its own private key and sends the signed response. Upon receiving the signed response, the smart lock of the asset 84 can confirm that this is the correct user device.

S818: The asset 84 can now verify the identity of the mobile phone using the received information.

S819: Afterwards the user device 83 can send action instructions such as "open" or "close" instructions to the smart lock of the asset 84.

S820: The smart lock of the asset 84 responds by performing the respective action and providing access to the user or the user device 83.

Figure 9:
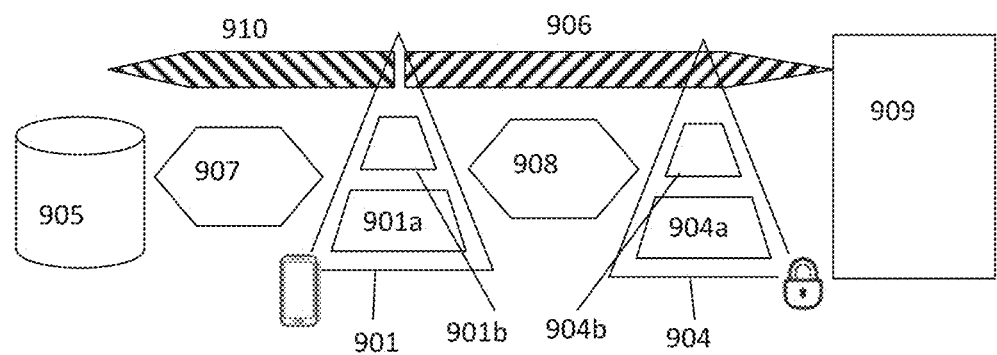
FIG. 9 schematically shows an example for the basic token exchange between the owner device and the smart lock.

FIG. 9 furthermore illustrates an example for the basic token exchange between an owner device 901, which comprises hardware 901a as well as software 901b components, and a smart lock 904, which also comprises hardware 904a as well as software 904b components, in order to provide an identification 909, which is necessary for accessing the asset protected by the smart lock 904. The owner device 901 creates the token 906 and transmits the token 906 via a Bluetooth connection 908 to the smart lock 904, which can then verify the identification of the owner device 901 as discussed above. The owner device 901, in this example, does not necessarily register the token 906 on the Blockchain 905, but rather only registers meta information 910 related to the token 906 on the Blockchain network 905 using, for example, a GPRS connection. The meta information may, for example, include some of the data related to the creation of the smart contract or of the token 906, such as a Blockchain address of the smart contract, or may simply state that a token created by the specific owner device 901 exists for the specific smart lock 904. The smart contract's address may serve as the smart lock identity and might hold the owner's account address.

Figure 10:
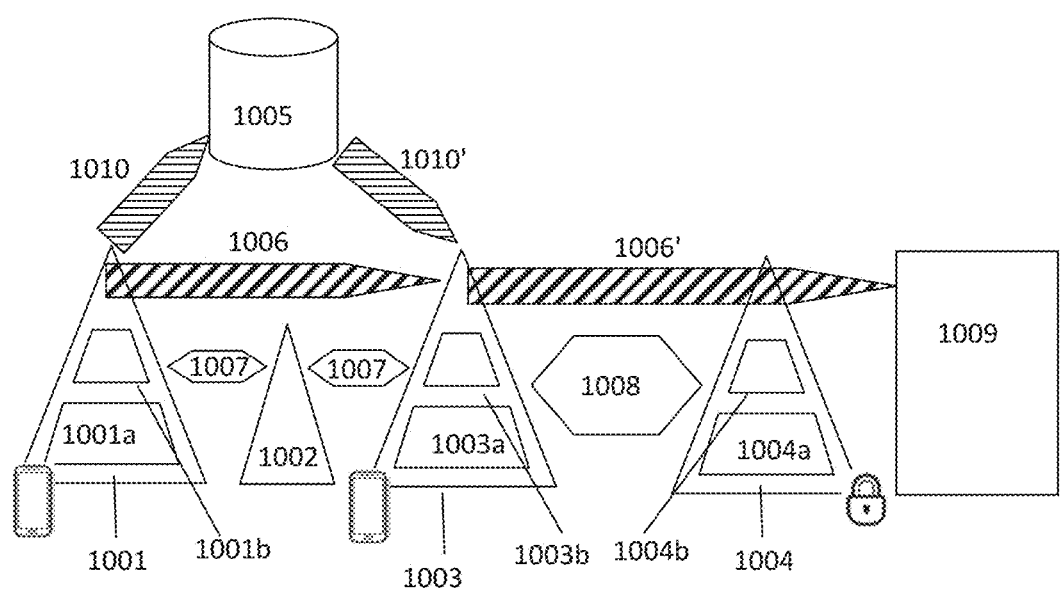
FIG. 10 schematically shows an example for the basic token exchange between the owner device and the smart lock via a user device as an intermediate media.

FIG. 10 illustrates a more elaborate version of FIG. 9, i.e. an example for the basic token exchange between the owner device 1001, which comprises hardware 1001a as well as software 1001b components, and a smart lock 1004, which also comprises hardware 1004a as well as software 1004b components, via the user device 1003, which also comprises hardware 1003a as well as software 1003b components, as an intermediate media, in order to provide an identification 1009, which is necessary for accessing the asset protected by the smart lock 1004.

As in FIG. 9, the owner device 1001 creates the token 1006 and only registers limited meta information 1010 regarding the token 1006 on the Blockchain network 1005. The owner device 1001 furthermore sends the token 1006 to the user device 1003 via GPRS connections 1007 established using a P2P server 1002. The user device 1003 can furthermore receive meta information 1010' regarding the token from the Blockchain network 1005 and verify the validity as well as receipt of the token 1006 with the Blockchain network 1005. The user device 1003 then sends the token 1006', which may have been altered slightly after having been received from the owner device 1001, via a Bluetooth connection 1008 to the smart lock 1004. The smart lock confirms the validity of the token, as already described above with respect to, e.g., FIG. 8 and provides access to the asset to the user device 1003.

In the following, online solutions for providing access to a smart lock are discussed, i.e. scenarios where the smart lock in connected to the internet and may directly receive and/or access information from a cloud server and/or the Blockchain network. If the smart lock is connected to the internet, a token as discussed with respect to the offline scenarios 1 and 2 above is not necessary, as the smart lock can verify the received information directly against the Blockchain network.

Figure 11:
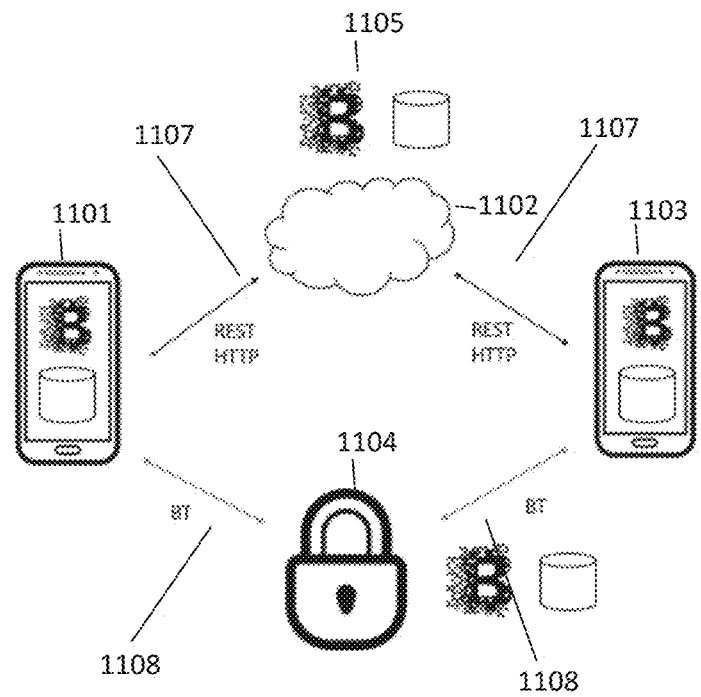
FIG. 11 shows the main components of FIG. 1 and their connections according to a third implementation scenario (also referred to as scenario 3).

Scenario 3:

According to implementation scenario 3, as illustrated in FIG. 11, the smart lock 1104, in addition to the mobile devices 1101, 1103, has a connection to the internet and is part of the Blockchain network 1105 in the sense that the smart lock 1104 synchronizes with the Blockchain network 1005. Also, according to the present scenario 3, the owner device 1101 as well as the user device 1103 also synchronize with the Blockchain network 1005 (as it was also the case for scenario 1 described above). The smart lock 1104 furthermore has a secondary radio for short distance communication, such as a Bluetooth radio 1008, which can be used for directly communicating with the mobile devices (for example with the owner device 1101 during setup and with the user device 1103 during authentication and for receiving respective action messages for opening and closing the lock). In principle, the mobile devices may also communicate with the smart lock over the internet or another long distance communication channel. However, for security reasons, it is usually preferable to use a communication channel which guarantees close proximity between the mobile device and the smart lock. If a long distance communication channel is used, then close proximity between the devices can additionally be ensured using a positioning system.

As in the other implementation scenarios, also in this implementation scenario 3, the smart lock 1104 is first setup by the owner device 1101 which preferably happens using a Bluetooth connection 1108 between the owner device 1101 and the smart lock 1104 in order to make the setup procedure as secure as possible.

After the setup, the owner device 1101 receives a request from a user device 1103, with which the user device 1103 requests access to the smart lock 1104 and the respective asset. The request should at least comprise identity information about the user device 1103, such as the public key of the user device 1103.

Afterwards a smart contract is generated by the owner device 1101 for the smart lock 1104 wherein the smart contract includes information, such as the public key, of the user device 1103. The smart contract is then registered on the Blockchain network 1105, which can be done locally on the owner device, as the owner device 1101 locally synchronizes with the Blockchain network 1105. During registration of the smart contract at least some metadata regarding the smart contract is transmitted to the Blockchain network 1105, preferably including at least one an identity information of the smart lock 1104, a public key of the owner device 1101 and/or the public key of the user device 1103.

The cloud infrastructures 1102 role in scenario 3 is primarily to set up p2p connections between the owner device 1101 and the user device 1103 and to provide the necessary infrastructure for supporting p2p encryption.

Once the smart contract or some information regarding the smart contract is sent to the user device 1103 by the owner device 1101, said user device 1103 receives a secureush notification from the owner device 1101. Push notifications are secured by the service provider. The user device 1103 needs to be synchronized with the latest changes from the Blockchain network in order to receive the smart contract information and validate said information against the Blockchain locally, as also discussed with respect to scenario 1 above.

The information regarding the smart contract to which the user device 1103 has access after the validation of the information received from the owner device 1101 comprises at least a smart lock Blockchain address as well as the smart contract application Binary Interface (ABI).

The mutual authentication between the user device 1003 and the smart lock 1004 as well as the passing of action messages for unlocking the smart lock 1004 by the user device 1003 is discussed in detail below with respect to FIGS. 13 to 15.

Figure 12:
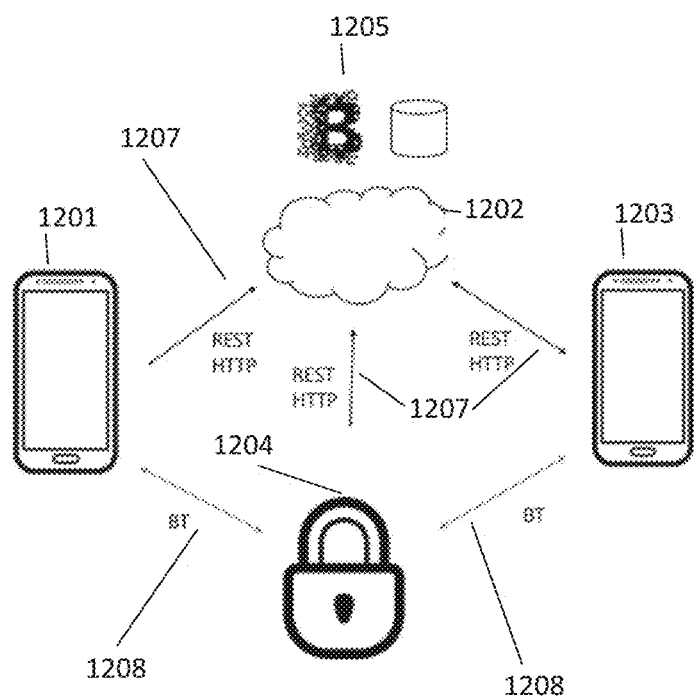
FIG. 12 shows the main components of FIG. 1 and their connections according to a fourth implementation scenario (also referred to as scenario 4).

Scenario 4:

According to another alternative scenario 4, as illustrated by FIG. 12, it is also possible that the smart lock 1204 as well as the owner device 1201 and user device 1203 each have an internet connection but, possibly due to storage and/or power constraints the mobile devices 1201, 1203 and the smart lock 1204 do not locally synchronize with the Blockchain network 1205. As discussed with respect to scenario 2 above, the owner device 1201 as well as the user device 1203 each have a Blockchain account and use a proxy server, such as the cloud server 1202 to exchange information and transactions with the Blockchain network 1205.

This scenario 4 is similar to scenario 2 with the additional feature that the smart lock may independently validate smart contract information with the Blockchain network, as further discussed below with respect to FIGS. 13 to 15.

In order to increase the security in case of network breakdown, it is also possible to use hybrid scenarios in which network and/or blockchain connectivity of smart lock may usually be given, as discussed with respect to scenarios 3 or 4, but which can generate a temporary token as discussed under scenarios 1 and 2 in case the connectivity of the smart lock is interrupted, for example due to low resources.

In each of the aforementioned scenarios, the sensitive information is preferably stored on the owner device and only meta information is shared with the blockchain network. When the key is shared with the user device, the relevant sensitive information is sent to the user device from the owner device through a p2p-connection, i.e. the sensitive information is may never be centrally stored. The digital key, token or smart contract may also be generated by the owner device and is stored locally on the owner device and, preferably, only less sensitive meta information about the key, token or smart contract is centrally stored. Preferably the stored meta information contains enough information to identify which device is allowed to use the lock under which circumstances, but the sensitive information necessary for actually unlocking the lock and gaining access to the respective property is only stored locally on the respective mobile devices. The validity of a digital key is furthermore dependent on the terms of the smart contract. For example the smart contract may specify a time or other constraints which need to be satisfied in order for the user device to gain access to the property protected by the smart lock.

With each of the scenarios described above, it is possible to securely exchange digital keys and to securely validate user permissions. Which scenario is most appropriate may depend on specific environmental and hardware constraints.

Figure 13:
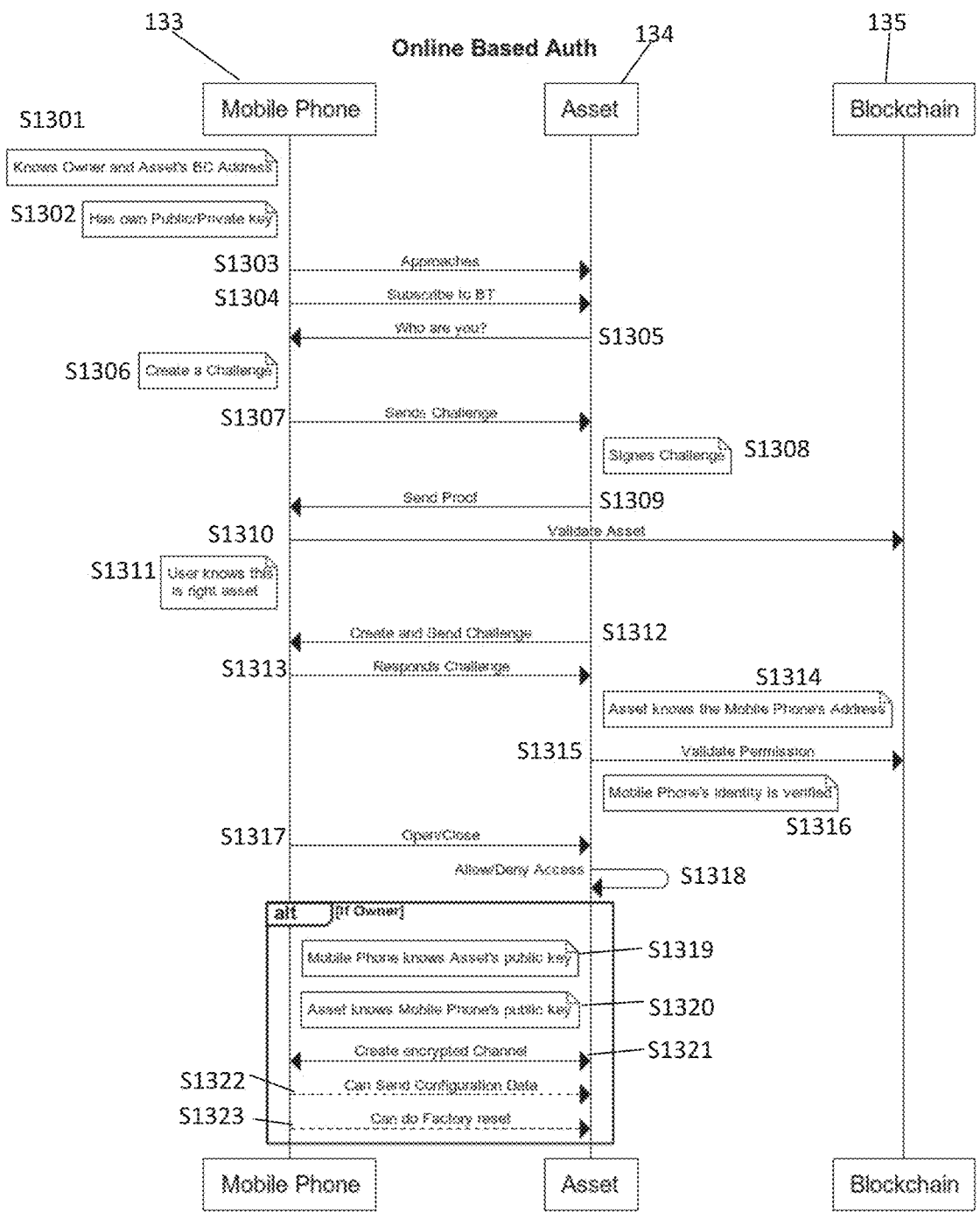
FIG. 13 shows the control flow and interactions between a user device, a car and the Blockchain during online authentication.

FIG. 13 provides an example for an authentication between the user device 133 and an asset 134, such as a smart lock of a car using an online solution in which the user device 133 as well as the smart lock of the asset 134 have access to the Blockchain network 135. The authentication is a multi-step process as follows:

S1301: The user device 133 knows the Blockchain address of the smart lock of the asset as well as of the owner device associated with the smart lock of the asset. Said information is, for example, contained in the smart contract which the user device 133 has already received and validated before.

S1302: Additionally, the user device 133 knows, by default, its own private key.

S1303: The user device 133 approaches the asset and, S1304, contacts the smart lock of the asset using the Bluetooth ID of the smart lock of the asset 134.

S1305: The smart lock of the asset 134 responds to the Bluetooth connection and the two devices pair up using Bluetooth radio.

S1306: The user device 133 creates a challenge in order to verify whether this is the right asset.

S1307: The user device 133 sends the challenge over Bluetooth to the smart lock of the asset 134.

S1308: The smart lock of the asset 134 signs the challenge using its private key.

S1309: The smart lock of the asset 134 returns the signed challenge to the user device 133 over Bluetooth.

S1310: The user device 133 validates the information received from the smart lock of the asset against the information stored on the Blockchain regarding the smart lock of the asset. The validation is based on the signed response from the challenge. The challenge is being signed with the Blockchain private key and the asset can validate the BC address extracted from the signed message. The address can be validated against the smart contract.

S1311: The user device has verified that this is the right asset.

S1312: The smart lock of the asset creates and sends a challenge for the user device 133 in order to confirm the identity of the user device 133.

S1313: The user device 133 encrypts the challenge using its own private key and sends the signed response. Upon receiving the signed response, the smart lock of the asset can confirm that the identity of the user device with which it is currently communicating over Bluetooth.

S1314: The asset 134 knows the mobile phone's Blockchain address from the interaction with the mobile phone.

S1315: The asset 134 then directly contacts the Blockchain network to validate whether this user device 133 has permission to access the asset 133. This respective information is stored on the Blockchain network with respect to the smart contract.

S1316: The asset has now verified the identity of the mobile phone as well as that the permissions of the mobile phone.

S1317: The use device can now send an action instruction such as an instruction to open the smart lock to the asset 134.

S1318: The smart lock of the asset 134 responds by performing the respective action and providing access to the user or the user device 133.

If the mobile phone is the owner device associated with the asset, the following steps are also possible:

S1319: The mobile phone knows the asset's public key per default, as the mobile phone is the owner device of the asset 134.

S1320: The asset 134 also knows the public key of its owner device and can, therefore confirm that the mobile phone is its owner device.

S1321: An encrypted channel can then be created between the mobile phone and the asset 134.

S1322: The mobile phone, which is the owner device of the asset, can then optionally send configuration data, for example to update the configuration of the asset 134.

S1323: Also, the mobile phone, which is the owner device of the asset, can initiate a factory reset of the asset.

The authentication between the user device and the smart lock of the asset of the online scenario of FIG. 13 therefore differs from the offline scenario of FIG. 8 in that the online scenario does not use a token as the validation is done directly against the Blockchain, and relies on the meta information regarding the smart contract which is registered on the Blockchain network. The smart lock of the asset and user device only need to authenticate each others identity using mutual digital signature validation, while the validation that this smart lock of the asset may actually be accessed by this specific user device is obtained and validated using the Blockchain network. The online solution thus provides greater flexibility and a more scalable infrastructure. However, in order to achieve this increased flexibility, every smart lock within the system needs to be connected to the internet, which increases power consumption and storage requirements.

The authentication as discussed above with respect to FIG. 13 works through signatures from which addresses may be extracted and the addresses may then be verified against the Blockchain. Secure connection is only possible if both devices know their own public/private keys to do encryption. Usually, only the owner can change the settings of the lock and only the owner can receive the public key of the lock after successful owner verification. The respective instructions can then be send from the owner device to the smart lock or asset using an encrypted channel.

Figure 14:
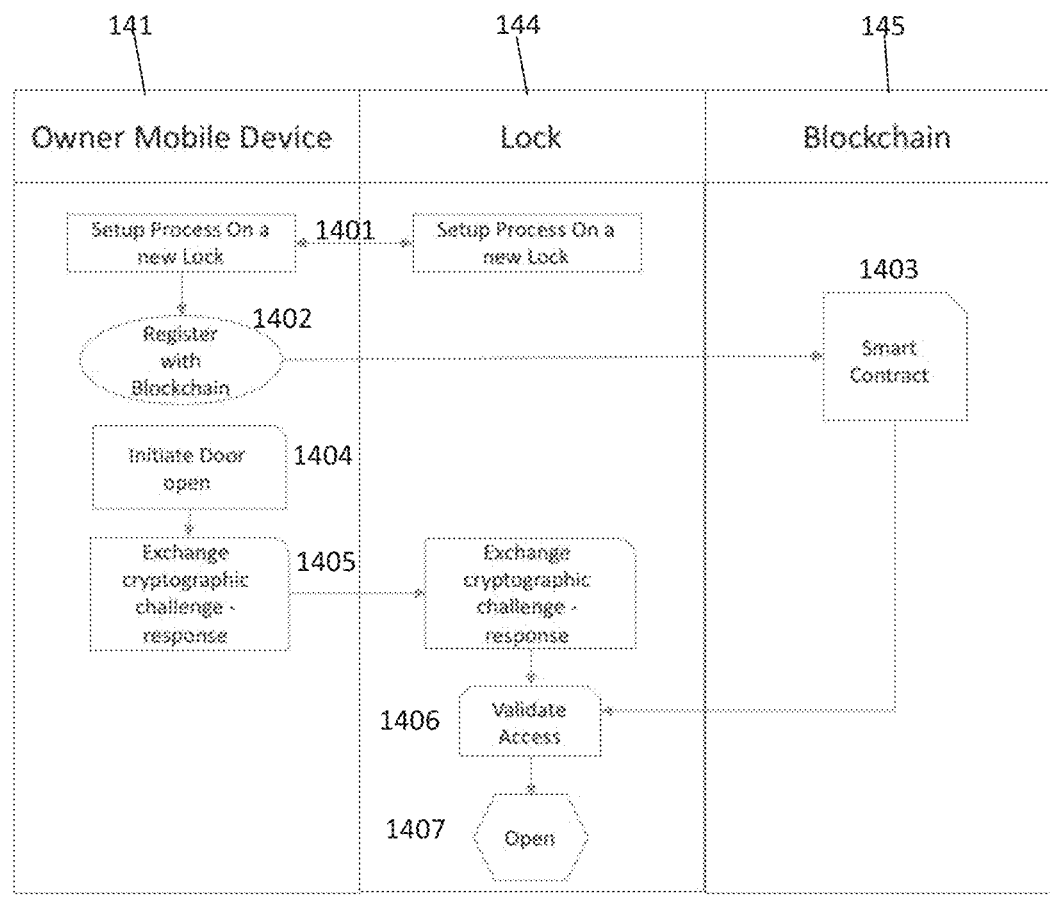
FIG. 14 shows a control flow of an owner device accessing its own asset and respective lock in an online solution.

FIG. 14 illustrates the how an owner device 141 may access its own asset and respective lock 144 in an online solution using validation against the Blockchain network 145.

The owner device 141 first performs the setup process 51401 with the lock 144, as described with respect to FIG. 4. Afterwards, the owner device 141 registers the lock with the Blockchain network 145 using a respective smart contract 1403.

The owner device 141 then initiates to open the door (Step 1404) upon which cryptographic signatures are exchanged (Step 1405) between the owner device 141 and the lock 144. The lock 144 then uses the respective information regarding the smart contract 1403 from the Blockchain 145 to validate (Step 1406) that the owner device is allowed to access the smart lock. After the access authorization of the owner device 141 has been confirmed, the smart lock performs the requested "open" action (Step 1407).

Figure 15:
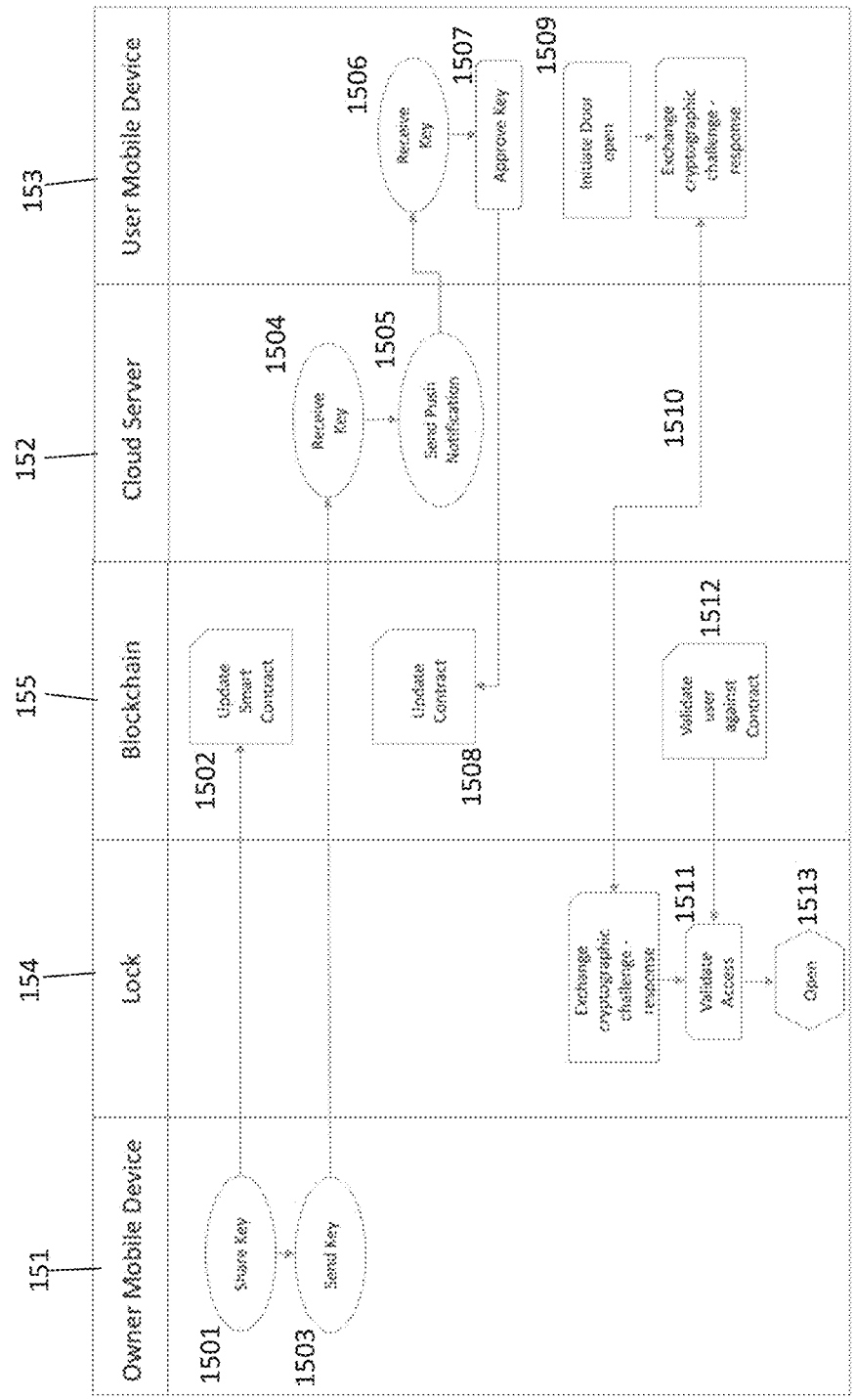
FIG. 15 shows a control flow of a user device accessing an asset and respective lock of an owner device in an online solution.

FIG. 15 provides a more general version of FIG. 14 and illustrates the how a user device may be granted access to a lock 154 associated with an owner device 151 in an online solution using validation against the Blockchain network 155.

After setup of the lock 154 by the owner device 151, the owner device 151 creates a smart contract or key for sharing (Step 1501) for the user device and registers or updates (Step 1502) respective information regarding said smart contract on the Blockchain network 155.

Afterwards the owner device 151 sends (step 1503) the key of smart contract or at least some information regarding the availability of the key or smart contract to the user device 153 via the cloud server 152, which first receives (Step 1504) the key and sends (step 1505) the respective push notification to the user device 153. The user device receives (Step 1506) the key and approves (Step 1507) the key, which causes key to be validated and also causes the smart contract information on the Blockchain to be updated (Step 1508). Using the validated key or smart contract information, the use device initiates (Step 1509) a door open procedure of the lock 154. The user device 153 and the lock 154 perform mutual digital signature validation (Step 1510) and the lock furthermore validates (Step 1511) against the contract information stored on the Blockchain (Step 1512) whether this user device 143 is allowed to access the lock 154. If all authentications and validations were successful, the lock then performs the requested open procedure (Step 1513).

Notification Payload:

The notification payload of sending the key, token or smart contract from the owner device to the user device, as, for example, discussed above with respect to Steps 1502-1506 of FIG. 15, is further described below. Please note that, while FIG. 15 is directed at an online solution, the notification payload as discussed in the following can be used for both online and offline solutions.

The payload of the notification, which is needed by the user device in order to access the respective lock comprises at least some of the following fields:

To: is the recipient of the key
From: is the sender of the key
Address: is the Blockchain smart contract address of the asset
ABI: is the Blockchain Smart Contract interface (required for importing a smart contracts into the recipient's wallet)
Name: is the name of the key as specified by the sender (can be changed locally by recipient)
Description: can be additional information in term of a message from the sender to the recipient
Picture: Optional picture or icon to ease distinguishing the key among any other keys the users have in their application
Btuuid: The uuid Bluetooth address of the asset to speed up the discovery of the device One example for setting the fields is shown below:

```
{
"to": "+4915227*****",
"abi": <ABI OBJECT>
"to": "+4935227*****",
"name": "BMW i8",
"description": "Key to your new BMW",
"address": "0x2cE224CaD729c63C5cDF9CE8F2E8B5B8181eC7B4",
"picture": "bmwi8.jpg",
"btuuid": "6E6B5C64-FAF7-40AE-9C21-D4933AF45C50"
}
```

Due to the size of the payload above, the push notification could also contain only the name and sender from the payload. Once the receiving user device opens the notification message, the rest of the payload can be downloaded from the server and deleted from there afterwards. This also prevents the case when the message is not received due to application crash or other unpredicted situations. The message preferably exists on the server until it has been received by the other side.

If the server executes the transaction on behalf of the user device, as discussed above with respect to scenarios 2 and 4, the sender payload to the server from the owner device contains Blockchain transaction, for example in JSON format, along with the push notification information provided above. The transaction is created and signed on the owner device. The server then executes this transaction, monitors the status of the transaction and after the transaction has finished, the server sends the push notification to the user device as mentioned above. The owner device also receives confirmation notification that the transaction has passed.

If the Blockchain transaction is executed directly on the mobile phone, as described above with respect to scenarios 1 and 3, the owner device monitors the execution of the transaction and then sends the payload described above to the server so it can notify the receiving user device with a push notification.

While four different implementation scenarios have been described above, said scenarios differ only with respect to the internet and/or Blockchain connectivity of the devices. The disclosure related to encryption, message passing and further features not specifically directed at Blockchain ad/or internet connectivity described with respect to any one of the scenarios may, therefore, is therefore also relevant with respect to the other scenarios.

The invention claimed is:

1. A method for digital authentication, comprising the following steps:
   receiving, by an owner device associated with a smart lock, identity information of a user device requesting access to the smart lock;
   initializing the smart lock, by the owner device associated with the smart lock, wherein initializing the smart lock by the owner device comprises a mutual exchange of public keys of the owner device and the smart lock;
   registering, by the owner device, first contract information of a smart contract, for granting access of the smart lock to the user device, on a decentralized trust network;
   sending, by the owner device, second contract information about the smart contract to the user device, wherein the second contract information comprises validation information of the smart contract indicating an un-validated information of the second contract information;
   validating, by the user device, the received second contract information against the first contract information on the decentralized trust network, causing the validation state of the second contract information to change from the un-validated state to a validated state;
   authenticating, initiated by the user device, the user device with the smart lock using the validated second contract information.

2. The method according to claim 1, further comprising the following step, before registering, by the owner device, first contract information of the smart lock on the decentralized trust network,
   registering, by the owner device, information, which indicates that the smart lock is associated with the owner device, on the decentralized trust network.

3. The method according to claim 1, wherein the identity information of the user device comprises a public key of the user device and wherein the smart contract comprises information regarding the public keys of the smart lock and the user device and the smart contract is signed using a private key of the owner device.

4. The method according to claim 2, further comprising the step of, before registering the first contract information on the decentralized trust network, generating, by the owner device, the smart contract for the user device for granting access of the smart lock to the user device.

5. The method according to claim 1, wherein the authentication of the user device with the smart lock comprises mutual digital signature validation.

6. The method according to claim 1, further comprising the step of, after authenticating the user device with the smart lock, sending, by the user device, an un-lock instruction to the smart lock, thereby causing the smart lock to unlock.

7. The method according to claim 1, wherein the smart lock has only a local, short distance data connection, and that during authentication of the user device with the smart lock, authentication data is transferred to the smart lock in the form of a token corresponding to the validated second contract information, wherein the smart lock uses the token to verify that access of the smart lock is granted to the user device by the owner device.

8. The method according to claim 1, wherein the smart lock has an internet connection and access to the decentralized trust network, and wherein it is validated, by the smart lock, on the decentralized trust network that access of the smart lock is granted to the user device by the owner device.

9. The method according to claim 1, wherein a connection between the owner device and the user device, with said connection used for sending the second contract information, is a peer-to-peer connection established via a centralized service.

10. The method according to claim 1, wherein the owner device and the user device are each part of the decentralized trust network and synchronize with the decentralized trust network.

11. The method according to claim 1, wherein the owner device as well as the user device each have an account on the decentralized trust network, through which they can access a server of the decentralized trust network, wherein transactions are created and/or signed locally on the respective device and executed on the server which synchronizes with the decentralized trust network.

12. A system for digital authentication, the system comprising:
a mobile owner device, a smart lock associated with the owner device and a mobile user device,
wherein the owner device is configured to:
receive identity information of the user device, wherein the user device is requesting access to the smart lock;
initialize the smart lock, by the owner device associated with the smart lock, wherein the smart lock initialized by the owner device comprises a mutual exchange of public keys of the owner device and the smart lock;
register first contract information of a smart contract for granting access of the smart lock to the user device on the decentralized trust network; and
send second contract information about the smart contract to the user device, wherein the second contract information comprises validation information indicating an un-validated state of the smart contract;

wherein the user device is configured to:
receive the second contract information from the owner device;
validate the received second contract information with the decentralized trust network, causing the validation state of the smart contract comprised by the second contract information to change from an un-validated state to a validated state; and
authenticate the user device with the smart lock using the second contract information in the validated state.

13. The system according to claim 12, wherein the smart lock only has a short distance data connection and wherein the user device is further configured to authenticate the user device with the smart lock by sending authentication data to the smart lock in the form of a token corresponding to the validated second contract information and wherein the smart lock is further configured to verify that access of the smart lock is granted to the user device by the owner device using the token.

14. The system according to claim 12, wherein the smart lock is configured to connect to an internet and to the decentralized trust network, and wherein the smart lock is further configured to validate on the decentralized trust network that access of the smart lock is granted to the user device by the owner device.

15. The system according to claim 12, wherein the owner device as well as the user device each have an account on the decentralized trust network, through which they can access a server of the decentralized trust network, wherein transactions are created and/or signed locally on the respective device and executed on the server which synchronizes with the decentralized trust network.

* * * * *